(12) United States Patent
Siddappa

(10) Patent No.: US 11,928,725 B2
(45) Date of Patent: *Mar. 12, 2024

(54) METHODS FOR SEARCHING AND OBTAINING DESIGN ITEMS AND META DATA CONCERNING THE DESIGN ITEMS

(71) Applicant: Fashion for Globe, Inc., Frisco, TX (US)

(72) Inventor: Girisha Siddappa, Frisco, TX (US)

(73) Assignee: Fashion for Globe, Inc., Frisco, TX (US)

( * ) Notice: Subject to any disclaimer, the term of this patent is extended or adjusted under 35 U.S.C. 154(b) by 253 days.

This patent is subject to a terminal disclaimer.

(21) Appl. No.: 17/547,194

(22) Filed: Dec. 9, 2021

(65) Prior Publication Data

US 2022/0101421 A1 Mar. 31, 2022

Related U.S. Application Data

(63) Continuation-in-part of application No. 13/899,324, filed on May 21, 2013, now Pat. No. 11,205,209.

(60) Provisional application No. 61/821,158, filed on May 8, 2013, provisional application No. 61/791,403, filed on Mar. 15, 2013.

(51) Int. Cl.
*G06Q 30/00* (2023.01)
*G06Q 30/018* (2023.01)
*G06Q 30/0601* (2023.01)
*G06F 3/048* (2013.01)

(52) U.S. Cl.
CPC ..... *G06Q 30/0643* (2013.01); *G06Q 30/0185* (2013.01); *G06Q 30/0609* (2013.01); *G06Q 30/0627* (2013.01); *G06F 3/048* (2013.01)

(58) Field of Classification Search
CPC .................................................... G06Q 30/00
See application file for complete search history.

(56) References Cited

U.S. PATENT DOCUMENTS 10,918,150 B2 * 2/2021 Koh .................... G05B 19/4097
2002/0178061 A1 * 11/2002 Lam ........................ G06Q 99/00
705/14.68

(Continued)

OTHER PUBLICATIONS

OWASP, "Authentication Cheak Sheet", cheetssheetseries.owasp. org., dated Feb. 4, 2010. (Year: 2010).*

*Primary Examiner* — Mark A Fadok
(74) *Attorney, Agent, or Firm* — Johnston IP Law, PLLC

(57) ABSTRACT

In one instance, a system includes a server in communication with a computing device and comprising at least one processor and an application executable by the at least one processor to, among other things, generate a first graphical user interface (GUI) for receiving designer information associated with a designer, generate a second graphical user interface for receiving design purchaser information associated with a design purchaser, receive from the designer one or more clothing designs in a digital format available for matching and purchase, and perform a fraud check of any design received from the designer. The application further stores meta data concerning the desired design, generates another graphical user interface that is accessed in response to an identifying code read by a smart device, and provides at least some of the stored meta data to the smart device in response to reading the identifying code.

6 Claims, 19 Drawing Sheets

(56) References Cited

U.S. PATENT DOCUMENTS

2010/0135598 A1\* 6/2010 Olwen .................... G06F 16/40
              382/306
2011/0314031 A1\* 12/2011 Chittar ................ G06F 16/5854
              707/E17.019

\* cited by examiner

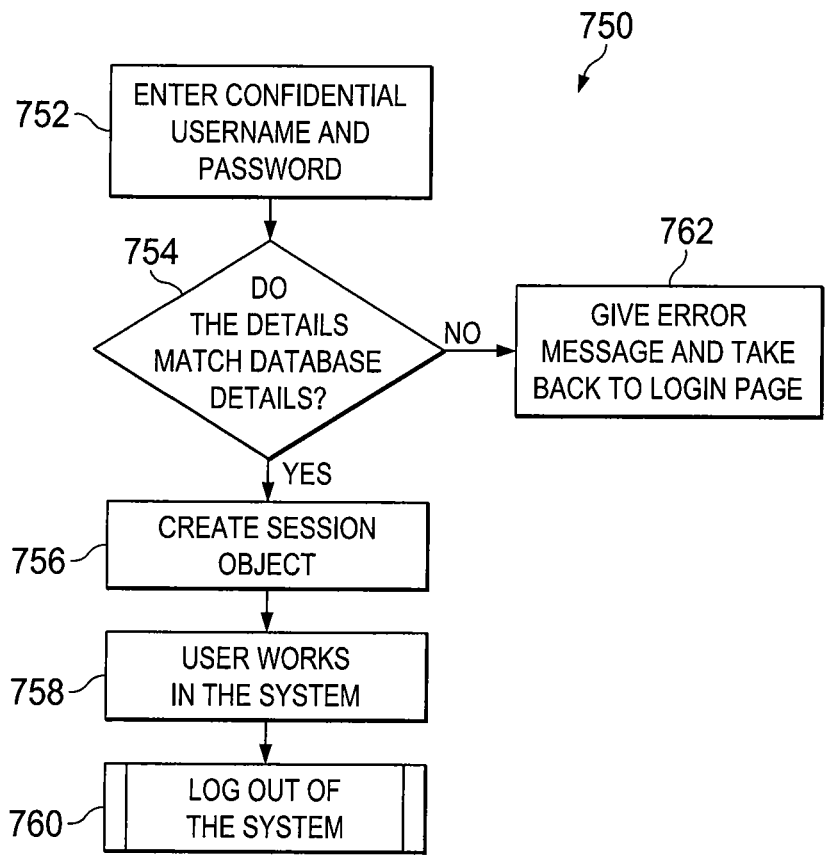
FIG. 7
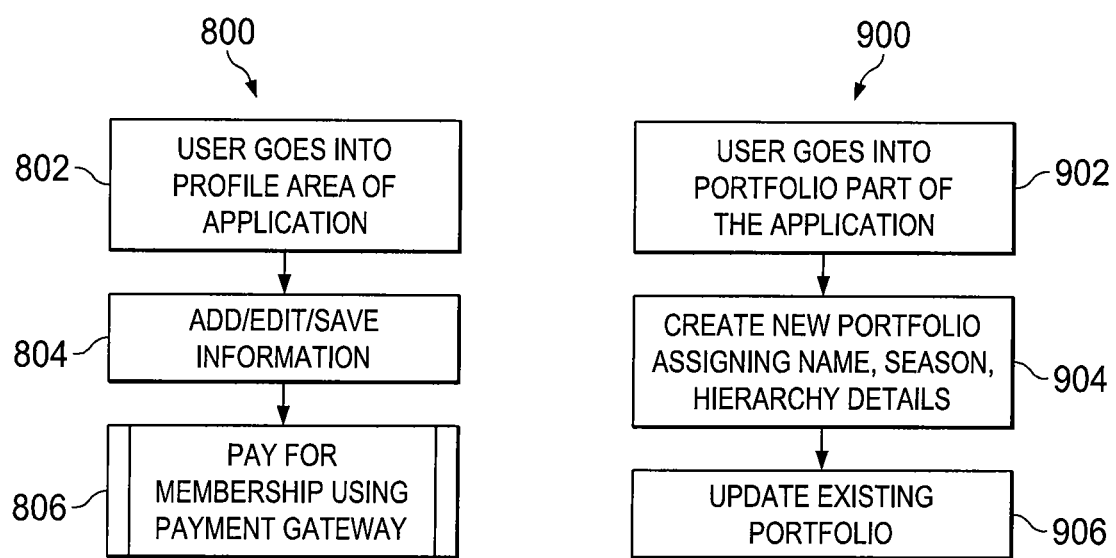
FIG. 8
FIG. 9

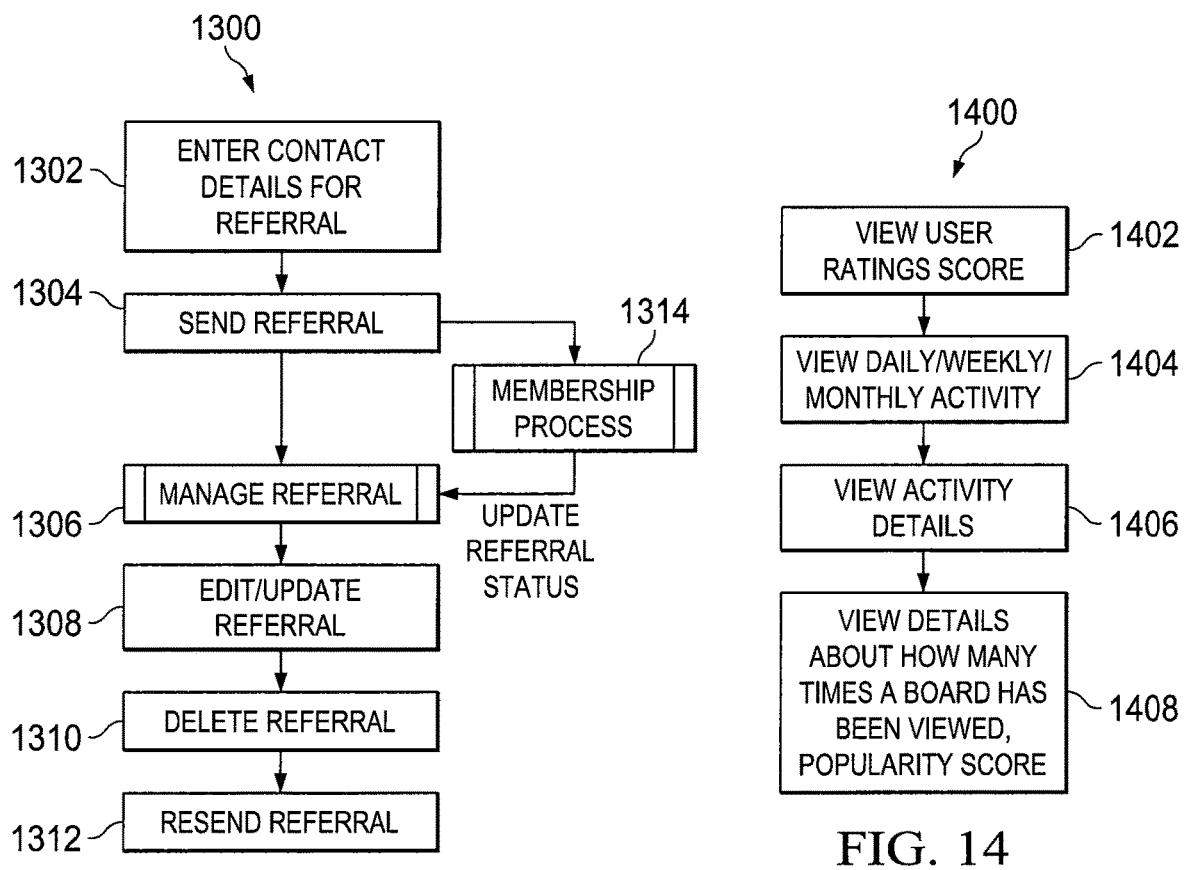
FIG. 13
FIG. 14
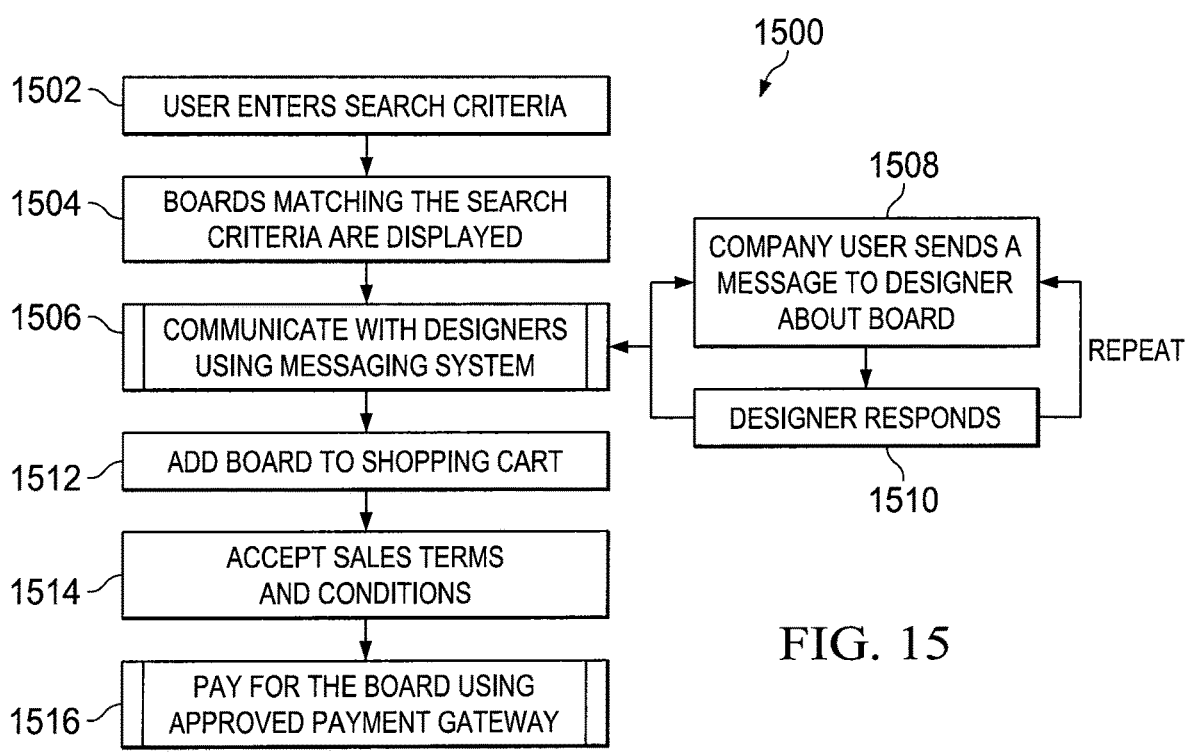
FIG. 15

FIG. 25

METHODS FOR SEARCHING AND OBTAINING DESIGN ITEMS AND META DATA CONCERNING THE DESIGN ITEMS

RELATED APPLICATIONS

This application is a continuation-in-part of U.S. Non-Provisional application Ser. No. 13/899,324, filed on May 21, 2013, entitled, "Methods for Searching and Obtaining Clothing Designs While Discouraging Copying," which claims the benefit of U.S. Provisional Application 61/791,403, filed on Mar. 15, 2013, entitled "Systems and Methods for Delivering Fashion Designs into the Retail Market," and U.S. Provisional Application 61/821,158, filed on May 8, 2013, entitled "Systems and Methods for An Online Fashion Design Marketplace," all of which are incorporated herein by reference for all purposes.

COPYRIGHT NOTIFICATION

Portions of this patent application include materials that are subject to copyright protection. The copyright owner has no objection to the facsimile reproduction by anyone of the patent document itself, or of the patent application as it appears in the files of the United States Patent and Trademark Office, but otherwise reserves all copyright rights whatsoever in such included copyrighted materials.

TECHNICAL FIELD

The present disclosure relates generally to the fashion industry, and more particularly, but not by way of limitation, to systems and methods for online fashion design marketplace.

BACKGROUND

The following discussion of the background is intended to facilitate an understanding of the present disclosure only. It should be appreciated that the discussion is not an acknowledgement or admission that any of the material referred to was part of the common general knowledge at the priority date of the application.

Designers typically develop items that may be become a popular style. For example, designers may design clothing, footwear, fashion accessories, furniture, or other artistic items. Typically, fashion designers have developed designs and then laboriously sought out retailers interested in having their designs made and sold. The nature of this market has limited the number of participants and the locations of designers and limited efficiency.

SUMMARY

According to an illustrative embodiment, a design matching system includes a server in communication with a computing device and comprising at least one processor and an application executable by the at least one processor to generate a first graphical user interface (GUI) for receiving designer information associated with a designer, generate a second graphical user interface for receiving design purchaser information associated with a design purchaser, validate the designer by checking designer credentials against a designer database or sign the designer up to have valid credentials in the designer database, receive from the designer one or more clothing designs in a digital format available for matching and purchase, perform a fraud check of any design received from the designer by comparing attributes of the design with a known design database, wherein comparing the attributes of the design includes more attributes than could be compared by a human in a commercially reasonable time, validate the design purchaser by checking a design purchaser credentials against a design purchaser database or signing up the design purchaser to have valid credentials in the design purchaser database, receive design search criteria from the design purchaser using the second graphical user interface, in response to the design search criteria, match the design search criteria with attributes of designs entered by the designer to develop a match set of designs, present the match set of designs to the design purchaser through the second graphical user interface including a set purchase price associated with each of the designs, receive a design selection of a desired design entered by the design purchaser through the second graphical user interface, receive payment from the design purchaser and deliver the desired design to the design purchaser, deliver at least a partial payment to the designer for the desired design, generate a third graphical user interface for receiving clothing manufacturer information associated with a clothing manufacturer; receive a bid request from the design purchaser to receive a manufacturing bid for the desired design, deliver the bid request to the clothing manufacturer, store meta data concerning the desired design, generate a third graphical user interface that is accessed in response to an identifying code read by a smart device, and provide at least some of the stored meta data to the smart device in response to reading the identifying code.

Other features and advantages of the illustrative embodiments will become apparent with reference to the drawings and detailed description that follow.

DESCRIPTION OF THE DRAWINGS

FIG. 7 is a schematic diagram of an illustrative process flow for a login process;

FIG. 8 is a schematic diagram of an illustrative process flow for one way for a user to update the user's profile;

FIG. 9 is a schematic diagram of an illustrative process flow for managing a user's portfolios in the system;

FIG. 13 is a schematic diagram of an illustrative process flow for a designer or design purchaser or other user to make a referral;

FIG. 14 is a schematic diagram of an illustrative process flow for a designer to access rating information and the like;

FIG. 15 is a schematic diagram of an illustrative process flow for a design purchaser to search for design boards and purchase the same;

FIG. 25 is an illustrative screen showing a design purchaser's design wall according to one aspect of an online design marketplace.

DETAILED DESCRIPTION

In the following detailed description of the preferred embodiments, reference is made to the accompanying drawings that form a part hereof, and in which is shown, by way of illustration, specific embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the claims.

Unless otherwise indicated, as used throughout this document, "or" does not require mutual exclusivity.

Figure 1:
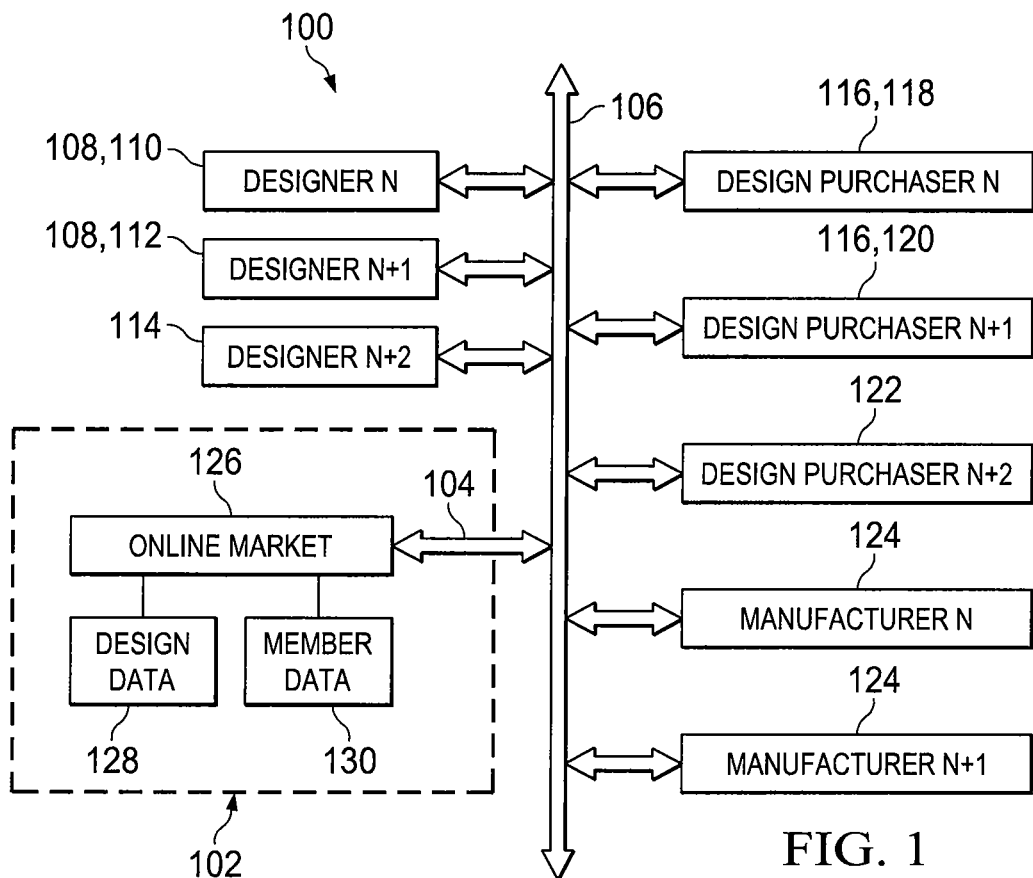
FIG. 1 shows an illustrative embodiment of a system for creating an online design marketplace.

Referring to the drawings and initially to FIG. 1, a system 100 for creating an online design marketplace is presented. The system 100 includes a data processing system 102 that communicates, connects, or transmits information as suggested by reference 104 over a communication network 106 to and from Users. Unless otherwise indicated, as used throughout this document, "or" does not require mutual exclusivity. The system 102 is operated by a design marketplace host. The users include a plurality of designers 108, such as designer N 110, designer N+1 112, designer N+2 114, and a plurality of design purchasers 116, for example design purchaser N 118, design purchaser N+1 120, and design purchaser N+2 122. It should be noted that the designs developed by the designers 108 and purchased or potentially purchased by the design purchasers 116 may be any kind of fashion-related designs such as clothing, clothing accessories, furniture, home accessories, jewelry, shoes, bags, belts, wallets, home goods/furnishings, artwork, fabric patterns, print patterns, etc. The designers 108 may be any person or organization or artisan that creates a design. The design purchasers 116 may be, for example, retailers looking for fashion designs or boutique shops looking for unique items, or others interested in purchasing designs. Optionally, the users may also include a plurality of manufacturers 124 who may be provided access to the system 100 in order to bid on carrying out the manufacturing of any of the purchased designs.

The data processing system 102 may include computers and other infrastructure for creating the online market. The data processing system 102 includes an online market module 126 that accesses one or more memories or storage devices that include design data 128 and member data 130.

Computers and of other aspects of the data processing system herein may be connectable with each other over any type of communication network 106 (e.g., LAN, WAN, intranet, Internet (including the World-Wide Web), cellular, etc.) via a server or other means. The World Wide Web ("Web") has provided additional opportunities for computers to connect or inter-communicate. For example, Web use often involves users interactively requesting Web pages from Web servers (e.g., via executing Web browser applications of the users) and receiving the requested information in response. In addition to such interactive user specification of requested information, there is also growing use of the Web to support the programmatic interaction of remote applications to exchange information via defined APIs ("application program interfaces"), referred to as Web services. Web services allow heterogeneous applications and computers to interact, and can be defined and implemented using a variety of underlying protocols and techniques. For example, some Web service implementations return data in XML ("extensible Markup Language") format using HTTP ("HyperText Transport Protocol") in response to a Web service invocation request specified as a URI ("Uniform Resource Identifier"), such as a URL ("Uniform Resource Locator") that includes a specified operation and one or more query parameters. In other implementations, additional underlying protocols are used for various purposes, such as SOAP ("Simple Object Access Protocol") for standard message exchange, WSDL ("Web Services Description Language") for description of service invocations, and UDDI ("Universal Description, Discovery, and Integration service") for discovery of available services.

Any of a plethora of devices and techniques may be used to communicate or transmit data and requests between the data processing system 102 and the users. Examples will be provided further below. The terms "communicate" and "transmit" (and variations thereof) are used interchangeably herein to refer to the exchange of data (typically digital data) within a single computer (e.g., between and among any of a script, an application, a control, etc.) and/or between one or more computers.

Figure 2:
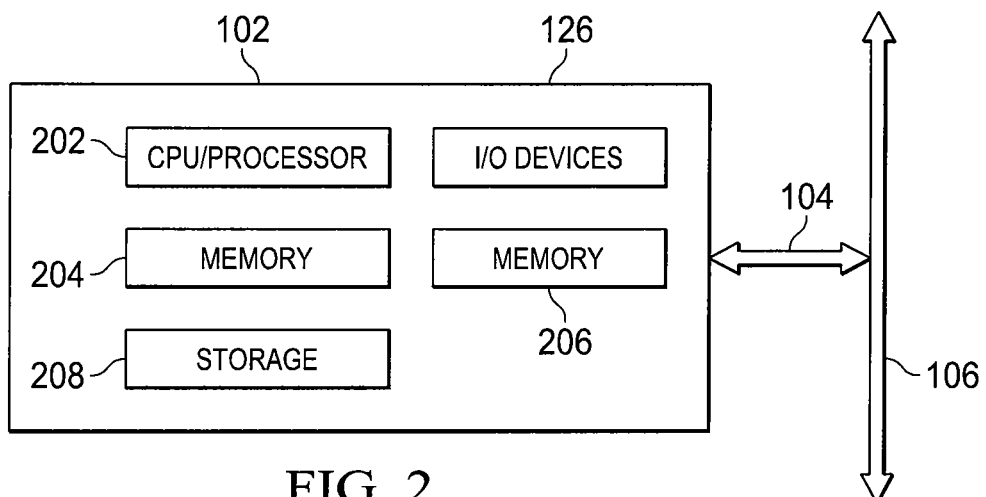
FIG. 2 is a schematic, block diagram of an illustrative embodiment of a data processing system for implementing the system of FIG. 1.

Referring now primarily to FIG. 2, the data processing system 102 comprises the online market module 126. The data processing system includes one or more processors/central processing units 202 that are associated with one or more memories such as memory 204 and 206 and may be associated with one or more storage devices 208. The data processing system 102 communicates with the communication network 106 as suggested by reference no. 104. The one or more processors 202 associated with one or more memories 204, 206 are configured to perform instructions in order to execute a method of creating an online design marketplace as described herein in the illustrative examples.

As used herein, the term "computer" is intended to be construed broadly, and in a non-limiting manner, and to include, without limitation and by way of illustration only, any electronic device capable of receiving input, processing, storing and providing output, typically as digital data. A computer may be a computer of any style, size, and configuration including, without limitation, a server, workstation, desktop, laptop, Internet appliance, notebook, personal digital assistant (PDA), etc. A computer typically includes the following components: a central processing unit (CPU or processor) operable in connection with software (e.g., operating system, application, etc.), a disk drive (e.g., floppy, CD-ROM, DVD, etc.), permanent memory (e.g., hard-disk drive, ROM), temporary memory (e.g., RAM), an input device (e.g., keyboard, mouse, trackball, etc.), an output device (e.g., display), and a communication interface.

Figure 3:
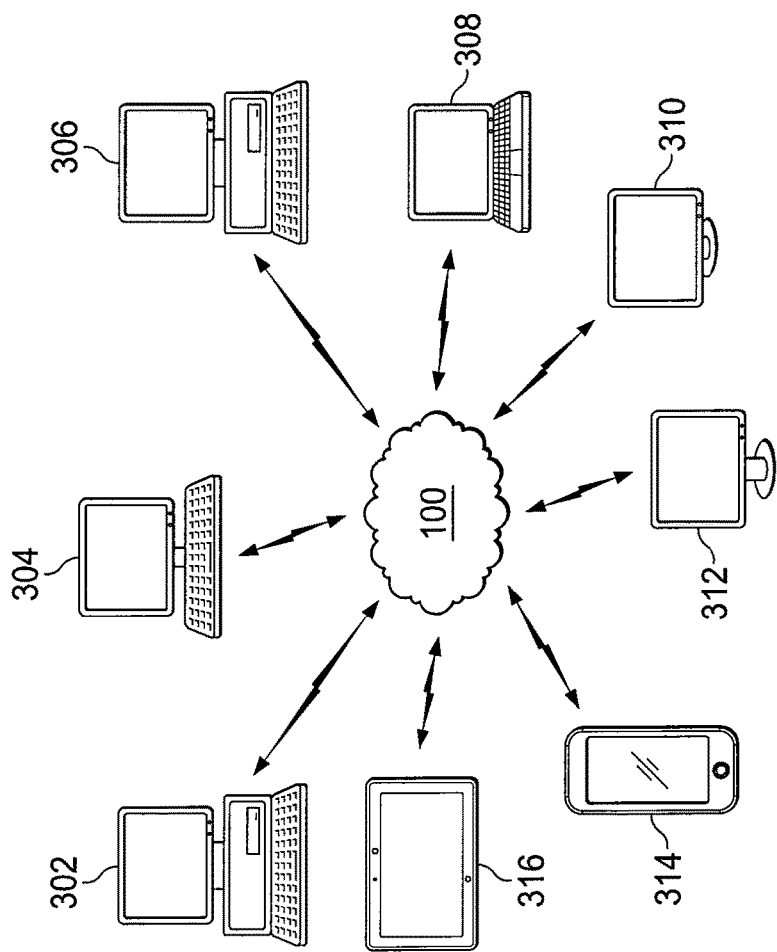
FIG. 3 is a schematic diagram of presenting an illustrative way that users may access the data processing system.

Referring now primarily to FIG. 3, the illustrative system 100 for creating an online design marketplace is shown as a cloud-based data center and numerous examples of input and output devices are shown. Non-limiting examples of devices that may be used to interact with the system 100 include personal computer 302, server terminal 304, virtual PC 306, laptop 308, gaming console 310, internet enabled television 312, smart phone 314, tablet computer 316, etc.

Figure 4:
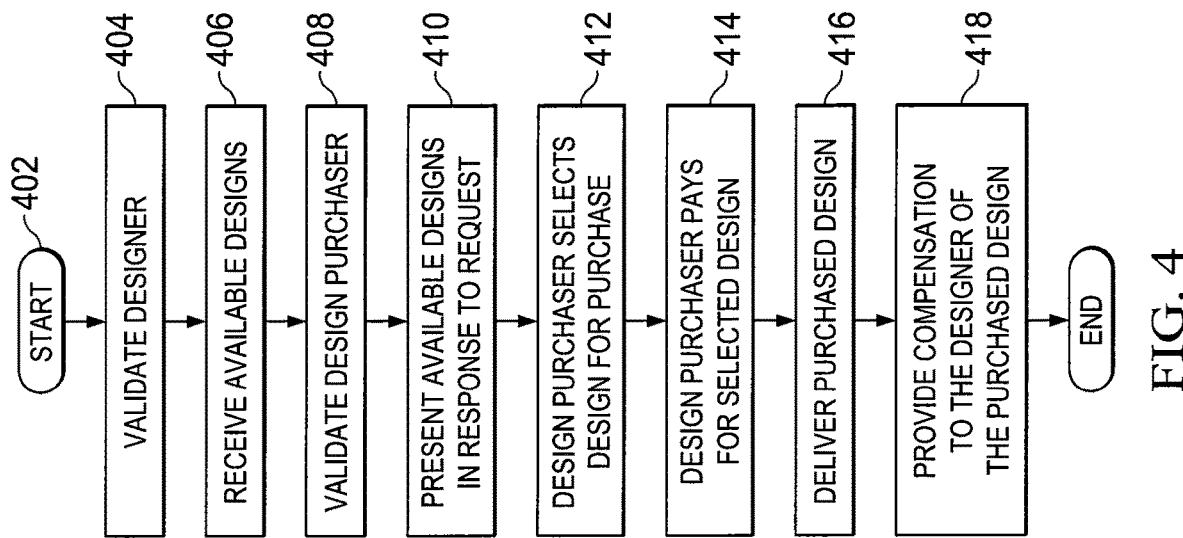
FIG. 4 is a flow diagram of an illustrative embodiment of a method for creating an online design marketplace.

Referring now primarily to FIG. 4, an illustrative method of creating an online design marketplace is presented. The process begins at 402 with a designer accessing the data processing system and the system validating the designer at step 404. To validate the designer, the data processing system 102 will have the designer enter validation data, such as an identification (ID) and password. The validation data is compared against a validation data base to make sure that the designer has previously enrolled, such as through the process shown in FIG. 5, and is current. Once the designer is validated, the designer may upload the designs into the data processing system 102 as is shown in step 406. The uploaded designs are available designs for purchase.

At step 408, a design purchaser comes to the data processing center 102 via the communication network 106 and is initially validated. Analogous to the validation of the designer, the design purchaser enters validation data, such as an ID and password, that is compared to a validation data base. Once the design purchaser is validated, the design purchaser is provided access to available designs in response to a request as shown at step 410. The design purchaser may browse through menu requests or may request designs using search criteria. Designs are thus presented to the design purchaser in response to their request. The design purchaser may then select one or more designs for purchase as shown at step 412.

The design purchaser pays a purchase compensation for the one or more selected designs at step 414. This may be accomplished using a payment gateway. In exchange, the data processing system 102 will deliver (push or allow for down loading) the purchased design as shown at step 416. If the marketplace host has not outright purchased the design that was placed onto the data processing system 102, an appropriate share of compensation to the designer of the purchase designed is provided to the designer at step 418. In one embodiment, the host of the online design marketplace passes all of the purchase compensation to the designer and only realizes revenue from membership fees. In another lesser embodiment, the online design marketplace host may purchase designs outright for subsequent resale through the system 102. In another illustrative embodiment, the online design marketplace host may receive revenue from membership fees as well as a percentage of the purchased compensation and the remaining portion of the purchased compensation may be forwarded to the designer of the purchased design. Numerous other options and additions may be made to the method of FIG. 4.

Figure 5:
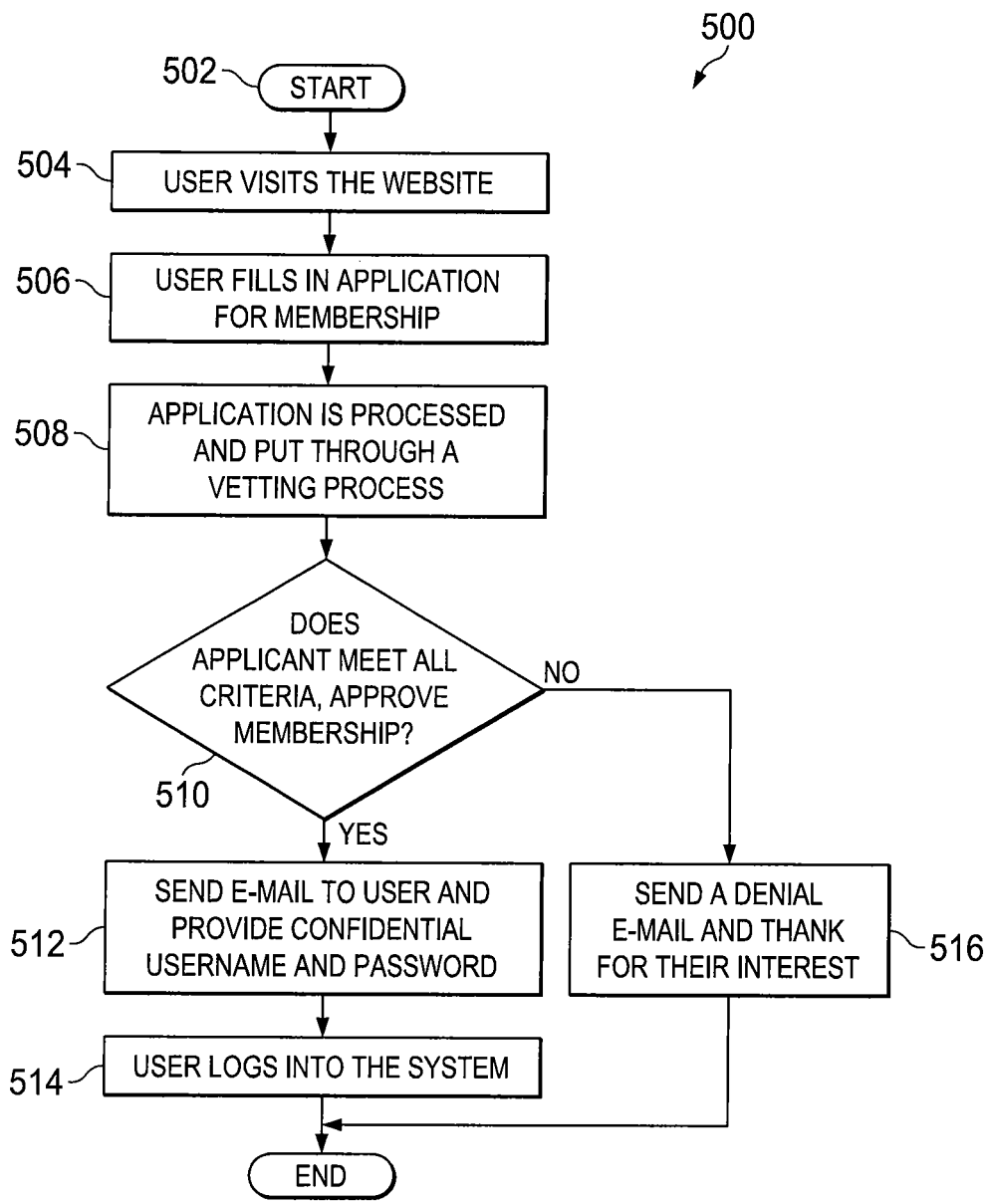
FIG. 5 is a flow diagram of an illustrative embodiment of a method of receiving a new member into the system for creating an online design marketplace.

Referring now primarily to FIG. 5, one illustrative way the users 108, 116, 124 may be validated is presented. The validation is accomplished through a membership process 500. Once validated the members can access system 102. The process begins at step 502. A user visits the product website or data processing system 102 as shown at step 504 and enters the requested information at step 506. The request is processed and the applicant may be put through the vetting process 508 where the information may be compared with acceptance criteria. If the applicant meets all the required criteria, as analyzed at interrogatory step 510, the process goes to step 512 and the application is approved and the user is given access to the functionality of the system 102. The access may be granted by providing a confidential username and password or a distributing of a fob or other secure access provision at step 512. The user may then access the functionality of the system 102 as shown at step 514. If the applicant does not meet the criteria at interrogatory 510, an email is sent to applicant stating that their access to the system 102 is denied at step 516 and thanking them for their interest in the system 102. Alternatively, the message may be displayed on the user's input device and an alternative course of action may be provided.

Figure 6A:
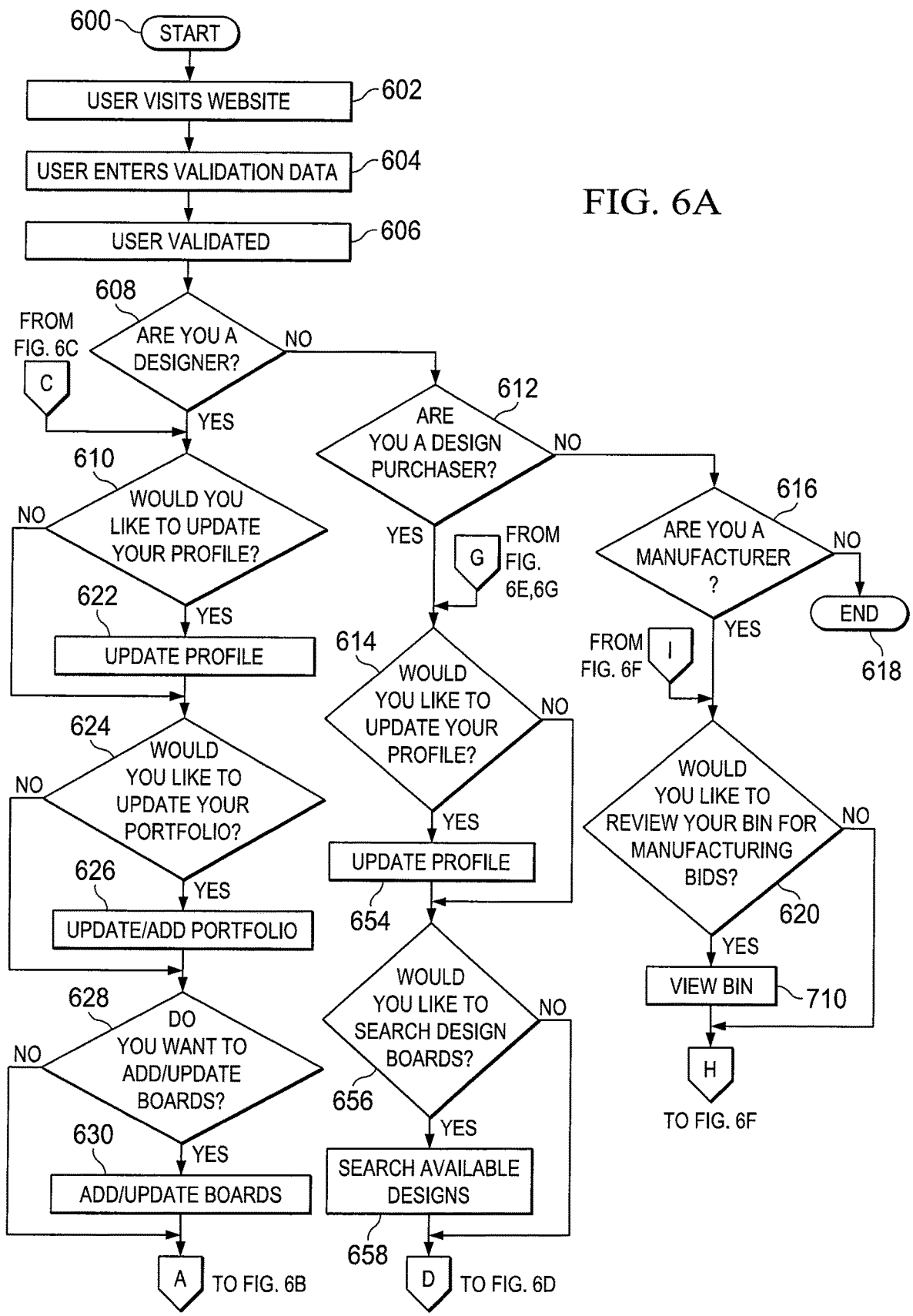
FIGS. 6A-6G are flow diagrams of an illustrative embodiment of a method for creating an online design marketplace.

Referring now to FIGS. 6A-G, and initially to FIG. 6A, a method of creating an online design marketplace is presented. In this illustrative embodiment, the process begins at step 600 and the user visits the website or otherwise interacts with the data processing system 102 as suggested at step 602. The user enters validation information at step 604. The validation data or information, such as an ID or password, is used to validate the user as a member. The validation data is compared against validation data entered into a data base in order to validate the user as a member as suggested at step 606. Based on a profile of the user or with an online interrogatory, the process will proceed based on the type of user. Thus, one may view this aspect of a method as asking if the user is a designer at interrogatory 608. If the user is a designer, the process continues to interrogatory 610. If the user is not a designer, the method considers whether the user is a design purchaser at interrogatory 612. If the user is a design purchaser, the method continues at step 614. If the user is not a design purchaser, the method considers whether the user is a manufacturer at interrogatory 616. If not, other user categories could be asked, or the process may end as suggested at step 618 with an error notification or other information to contact customer service. If the user is a manufacturer, the method continues to step 620.

Returning now to interrogatory 610, the user, who has been established as a designer, is asked if he or she would like to update his or her profile. It should be noted that while these interrogatories are presented as questions, they may simply be selections on a navigation screen. If the designer would like to update his or her profile, the profile is updated at step 622. If not, the method continues to interrogatory 624 to determine if the user would like to update his or her portfolio. If the user updated his or her profile 622, the method proceeds to interrogatory 624. If the user would like to update his or her portfolio, the portfolio is updated at step 626 and the method continues to Interrogatory 628. If the user does not want to update their portfolio, the process continues directly to interrogatory 628.

Figure 6B:
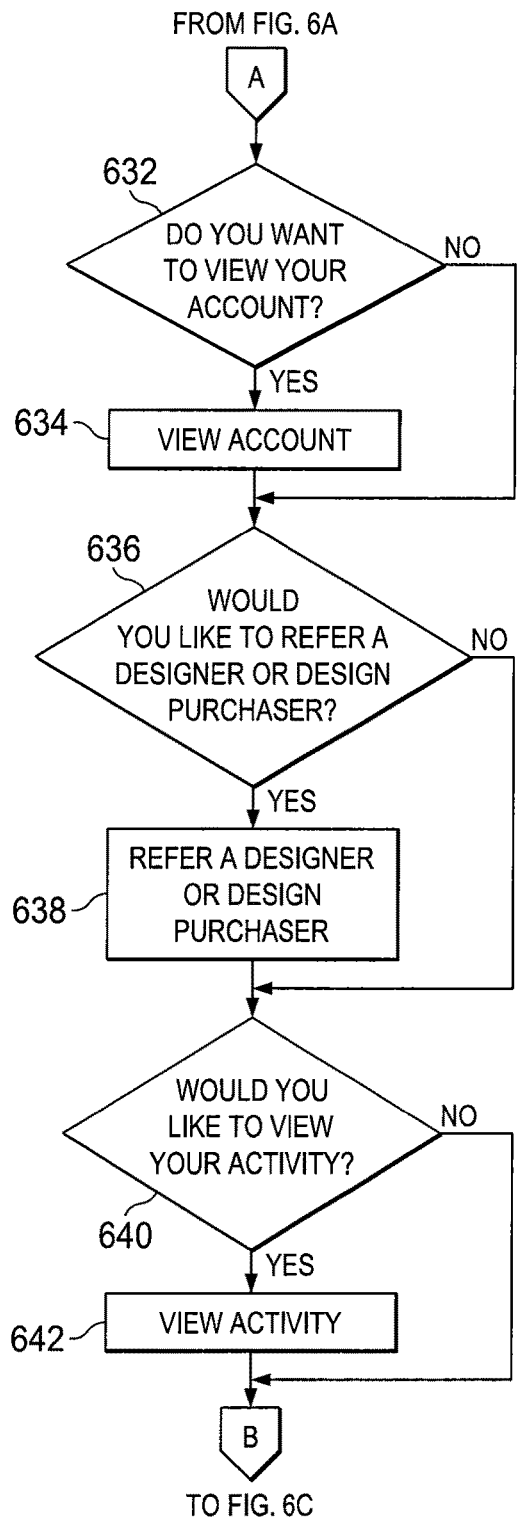

At interrogatory 628, an inquiry is made as to whether the user wants to add or update design boards. If affirmative, the user will add or update design boards at steps 630 and then the process will continue to step 632 (FIG. 6B). In one embodiment, the designer 108 agrees that the design uploaded is unique and is being offered exclusively through system 100. The designer may be required to certify that design will not appear on any other site including the designer's own website and not shared with others outside of the system 100. If the user does not want to update boards the process continues directly to interrogatory 632. At interrogatory 632, the user is asked whether they want to view his or her account. If affirmative, the process continues to step 634 where the account information is provided and then the process continues to interrogatory 636. If the answer to interrogatory 632 is negative, the process proceeds directly to interrogatory 636.

Figure 6C:
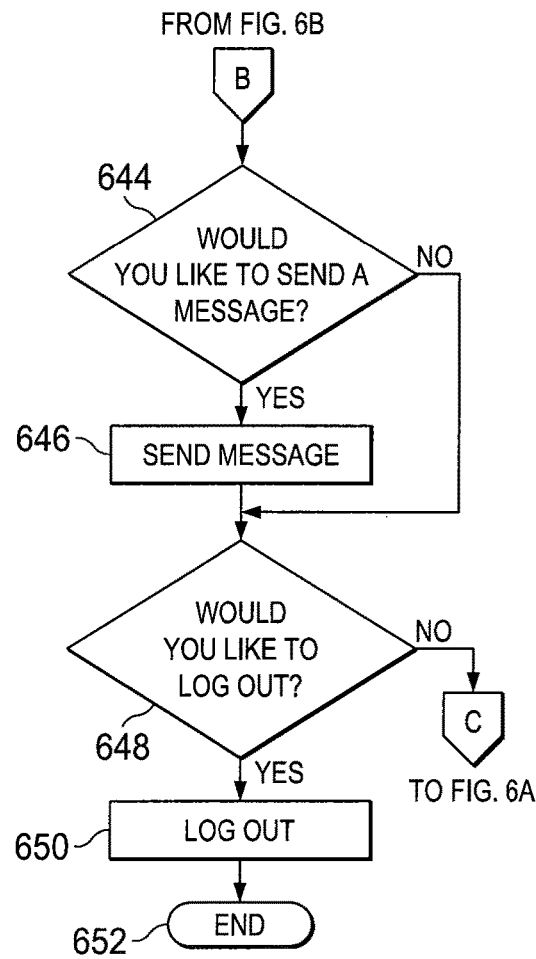

Interrogatory 636 determines if the user would like to refer a designer or design purchaser. If affirmative, the user provides information about a proposed designer or a design purchaser who might be interest at step 638, and the process continues to interrogatory 640. If the answer to interrogatory 636 is in the negative, the process continues directly to interrogatory 640. Interrogatory 640 asks if the user would like to view his or her activity in the system 102. If the answer is in the affirmative, the process continues to step 642 and then to interrogatory 644 (FIG. 6C). If interrogatory 640 is in the negative, that is he or she does not want to view his or her activity, the process continues directly to Interrogatory 644.

Interrogatory 644 asks whether the user would like to send a message. In this regard, messages may be sent within the system 102 to other designers or design purchasers or optionally manufacturers. If the user would like to send a message, the process continues to step 646 and a message is sent, and the process continues to interrogatory 648. If the user does not want to send a message at interrogatory 644, the process proceeds directly to interrogatory 648. Interrogatory 648 inquires as to whether the user would like to log out. If affirmative, the system logs out the user at step 640 and the process ends at step 652. The logout process may include deleting any or all session objects/cookies and related user session data. If the user does not want to log out, i.e., the interrogatory 648 is answered in the negative, the process continues by going back to interrogatory 610 (FIG. 6A).

Returning again to FIG. 6A, if the user is a design purchaser, the user is asked if they would like to update their profile at step 614. If the answer to interrogatory 614 is affirmative, the user updates their profile at 654 and the process continues to interrogatory 656. If the user does not want to update their profile at interrogatory 614, the process continues directly to interrogatory 656.

Interrogatory 656 considers whether the user would like to search for available designs or search design boards. If the answer is affirmative, the process continues at step 658. At step 658, the user may enter desired search criteria to be used to search through the available designs of the data base. Alternatively, a menu-driven system may be used to allow browsing at the user's request. The menu options drive de facto answers to interrogatories. Likewise, the system 102 may use a series of hyperlinks that when selected take the user directly to the functionality desired. These variations will be understood by a person of ordinary skill in the art.

Figure 6D:
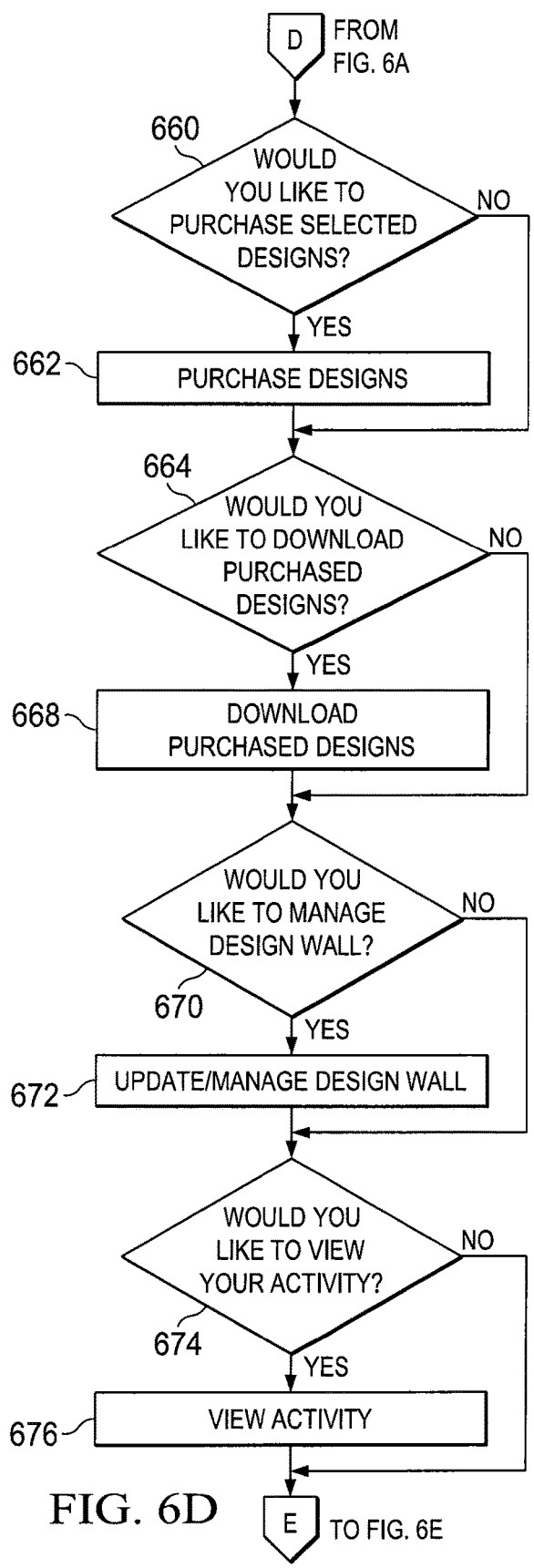

After searching available designs, which includes the ability to select one's for purchase, the process continues to interrogatory 660 (see FIG. 6D). If Interrogatory 656 is answered in the negative, i.e. the user does not want to search available designs, the process continues directly to interrogatory 660.

Interrogatory 660 inquires as to whether the user would like to purchase the selected designs. If the answer is in the affirmative, the process continues to step 662, where the designs are purchased using a purchase gateway or other mean of exchanging purchase compensation, and the process continues to interrogatory 664. If interrogatory 660 is answered in the negative, the process continues directly to interrogatory 664. At interrogatory 664, the user is asked if they would like to download any purchased designs. If the answer is an affirmative, the process continues to step 668 where the designs are downloaded which includes by push presentation, and the process continues to interrogatory 670. If the answer to interrogatory 664 is a negative, the process continues directly to interrogatory 670.

Figure 6E:
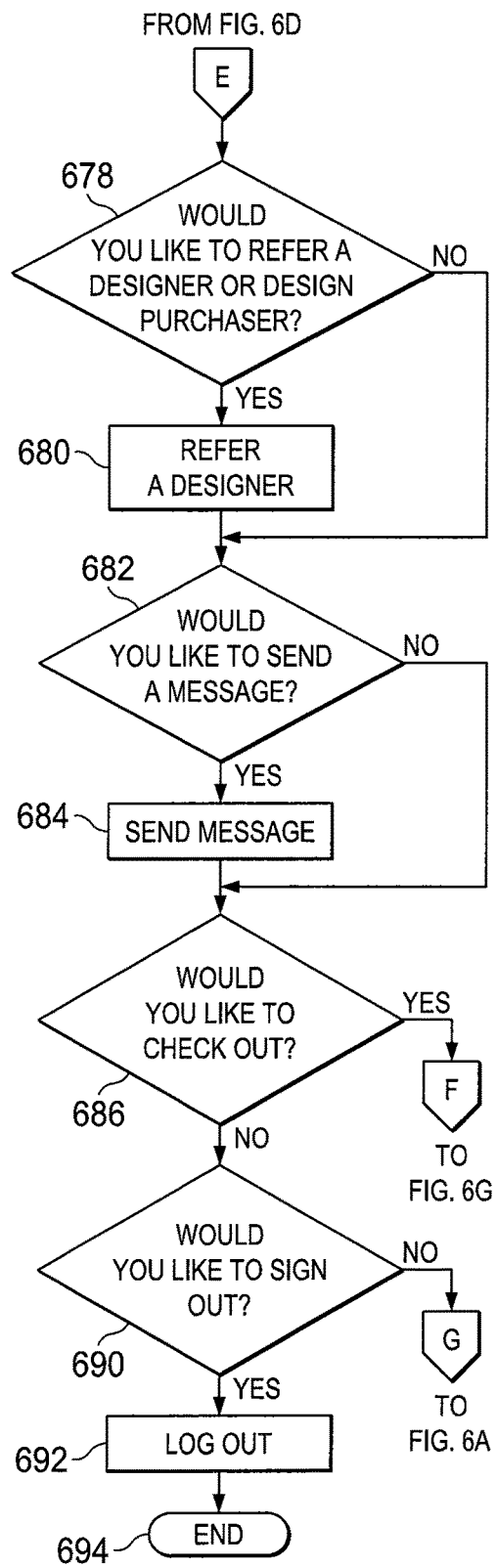

Interrogatory 670 asked the user if he or she would like to manage his or her design wall. If the answer is in the affirmative, the process continues to step 672. Updating and managing the design wall may include any of a number of tasks, e.g., reviewing boards purchased, downloading boards, reviewing purchase data such as amount purchased, communications, or other options. The process then continues to interrogatory 674. If interrogatory 670 is answered in the negative, the process proceeds directly to Interrogatory 674. Interrogatory 674 inquires as to whether the user would like to view his or her activity. If the answer is an affirmative, the process continues to step 676 where the user's activity is presented to the user. The activity may include the number of boards viewed, the number of designs purchased, the dates of purchases, the dates of viewing, etc. Ratings may be included that are based on feedback from designers or design purchasers with respect to their experience with the other party in a transaction. The rating may involve a few questions presented to the party. The process then continues at interrogatory 678 (FIG. 6E). If the answer to interrogatory 674 is the negative, the process continues with interrogatory 678.

Figure 6F:
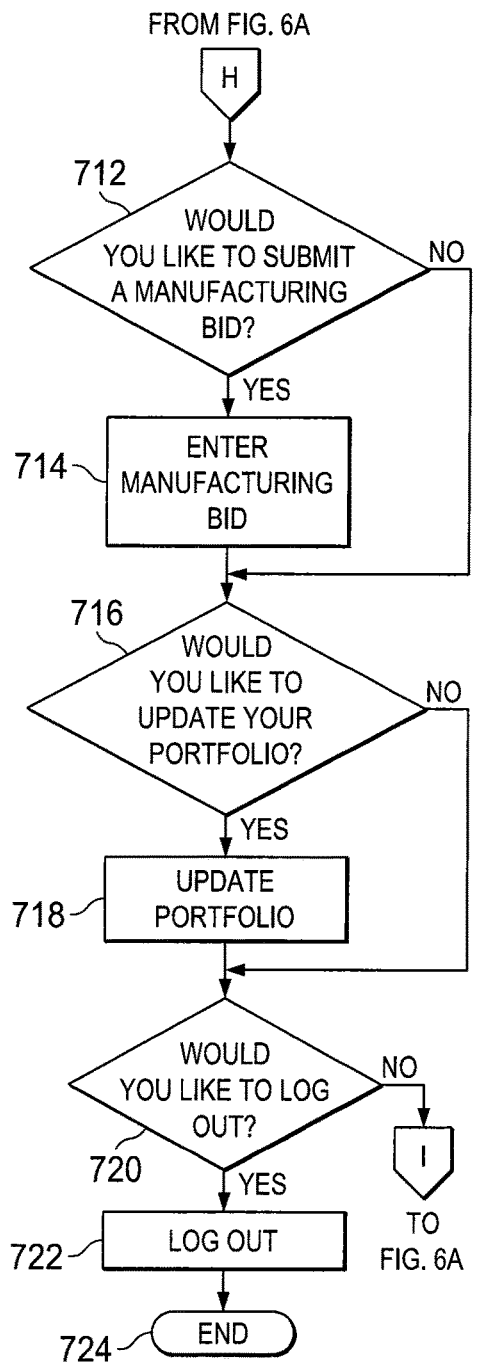
Figure 6G:
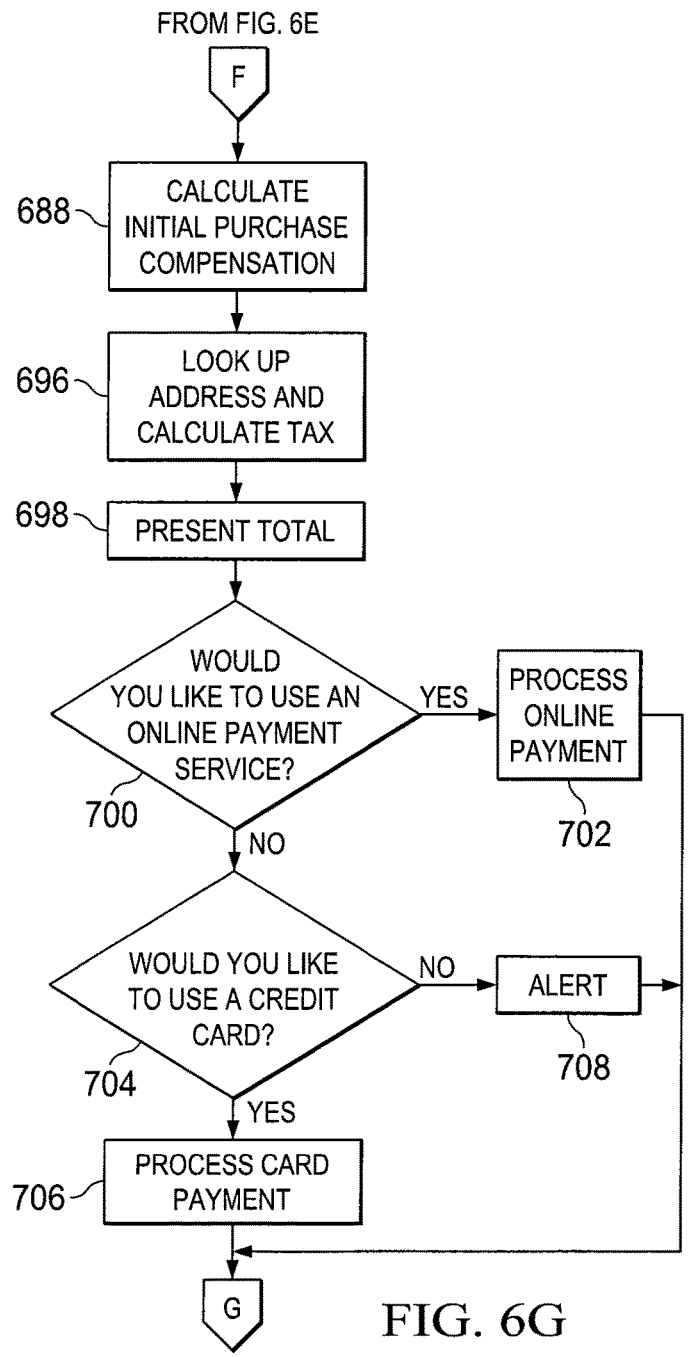

At interrogatory 678, the user is asked if he or she would like to refer a designer or design purchaser. If the answer is affirmative, the process continues to step 680 and the user enters the reference for the designer or the design purchaser and the process continues to interrogatory 682. In making a referral here and in other examples herein, the user may be asked for name, phone, and email. Other information may be requested as well. If interrogatory 678 is answered in the negative, the process continues directly to Interrogatory 682. Interrogatory 682 asks if the user would like to send a message within the data processing system. If the answer is in the affirmative, the process continues to step 684 where the user is allowed to send a message, and the process then goes to interrogatory 686. If the interrogatory 682 is answered in the negative, the process continues directly to interrogatory 686. Interrogatory 686, asks if the user would like to check out. If the user answers in the affirmative, the analysis continues at step 688 (FIG. 6G). If interrogatory 686 is answered in the negative, the process continues at interrogatory 690 and the user is asked if he or she would like to sign out. If the user does want to sign out, the process continues to step 692 and the system logs out the user and the process ends at step 694. The log out process may include deleting objects/cookies and related session data. If the user does not want to sign out, the process continues back to interrogatory 614 (FIG. 6A).

If the answer to interrogatory 686 is in the affirmative, and the user would like to check out, the process continues at step 688 (FIG. 6G), and the amount owed is calculated to determine the initial purchase compensation. Optionally, the user's profile may be used to determine the user's location and any local taxes may be calculated at step 696. Other items may be included in the calculation if desired. In the end, the final amount owed is presented to the user at step 698. The user is then asked if they would like to use an online payment service, e.g., PAYPAL service or SQUARE service, at Interrogatory 700. If the user would like to use an online payment service, the process continues to step 702 and the payment is processed according to the protocol of the online payment service using the payment service account and the process then continues to interrogatory 614 (FIG. 6A). If the user does not want to use an online payment service, the interrogatory 700 is in the negative and the process continues to interrogatory 704. Interrogatory 704 asks if the user would like to use a credit card. If the answer is in the affirmative, the credit card is processed for payment at step 706 and the process continues to interrogatory 614 (FIG. 6A). If the answer to interrogatory 704 is in the negative, the process continues to step 708 where an alert notification is given to the user to contact customer service or alternatively, other payment means may be provided as an option.

Returning again to FIG. 6A, if the user is a manufacturer, the process continues in interrogatory 620 where the user is asked if they would like to review a bin of requests for manufacturing bids. Bids may be submitted by design purchasers looking for manufacturing and placed by the system 102 in an electronic bin for review a bid by any validated manufacturer or bids may be sent directly to a known manufacturer for bid. If they answer to interrogatory 620 is in the affirmative, the process continues to step 710 and the user is provided access to a bin of designs to review in order to make a quote. The process continues at step 712 (FIG. 6F). If the answer to Interrogatory 620 is in the negative, the process continues directly to Interrogatory 712.

Interrogatory 712 asks if the user would like to submit a manufacturing bid. If the user's answer in the affirmative, the user enters a bid at step 714 and the process continues to interrogatory 716. If interrogatory 712 is answered in the negative, the process continues directly to interrogatory 716. At interrogatory 716, an inquiry is made as to whether the user would like to update his or her portfolio of manufactured examples. If the answer is in the affirmative, the user updates their portfolio at step 718 and the process continues to interrogatory 720. If interrogatory 716 is answered in the negative, the process continues directly to interrogatory 720. At interrogatory 720, the user is asked if they would like to log out. If the answer is in the affirmative, the user is logged out in step 722 and the process ends at 724. The log out process may include deleting objects/cookies and other session data. If Interrogatory 720 is answered in the negative, the process continues at interrogatory 620 (FIG. 6A). In another embodiment, the manufacturer 124, may be contacted by a design and asked to provide manufacturing approval of the design or to make a sample so the designer may upload a picture as well design board. In this instance, offered design may include an offer to not only purchase the design but specific pricing for manufacturing.

Referring now primarily to FIG. 7, an illustrative, non-limiting example of a login process 750 is presented. In this example, the log in process 750 utilizes a username and password or other validation data to validate the user. Once validated, the system 102 allows the user to use the application or functionality of the system 102. The user enters the username and password or other validation data at step 752. The username and password are then compared to a validation resource, e.g., values in a data base, at interrogatory 754. If the values match, i.e., an affirmative answer is received, then user is validated and a session begins as shown at step 756. In other words, the user is allowed to get into the system 102 and a session object is created at step 756, which helps to make sure that the data exchange is accurate. The user will work in the system as appropriate at step 758. When finished the user may indicate a desire to log out and the system 102 will log out as shown at step 760. At log out, all the related data, as appropriate, is cleared from system 102 to protect the user's data and identity. If the inquiry at interrogatory 754 is negative, i.e., the user name and password do not match information in the validation resource, then an error message is shown with explanation at step 762 and user is taken back to the log in screen.

Referring now primarily to FIG. 8, an illustrative embodiment of a process for the user 108, 116, 124 to update the user's profile is presented. The user navigates to profile information at 802 and then adds/edits/updates his or her profile details at step 804 and can also pay for membership payments using payment gateway at step 806. It will be appreciated at this point by those skilled in the art many approaches might be used to accomplish these tasks.

Referring now primarily to FIG. 9, an illustrative embodiment of a process 900 for managing a user's portfolio is presented beginning. The user, or designer in this instance, goes into the portfolio management screens at step 902 and may create a new portfolio at step 904 by entering the requested information like name, description, hierarchy and portfolio season. The designer can also modify/update existing portfolios at step 906.

Figure 10:
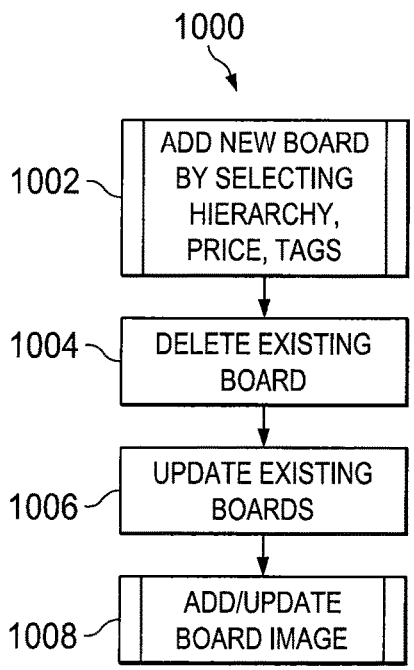
FIG. 10 is a schematic diagram of an illustrative process flow for a designer to update or add a design board.

Referring now primarily to FIG. 10, an illustrative process 1000 for a designer 108 to add/update board is presented. The designer 108 can add a board at step 1002 by entering information, e.g., board name, price, hierarchy, search tags, or other requested information. The designer 108 may delete an existing board at step 1004 and update any existing boards as shown at step 1006. The designer 108 can attach an image to a new board or modify the image for existing boards 1008. While shown sequential, it should be understand that the actions may be navigated by the user and will appear to be instantaneous.

Figure 11:
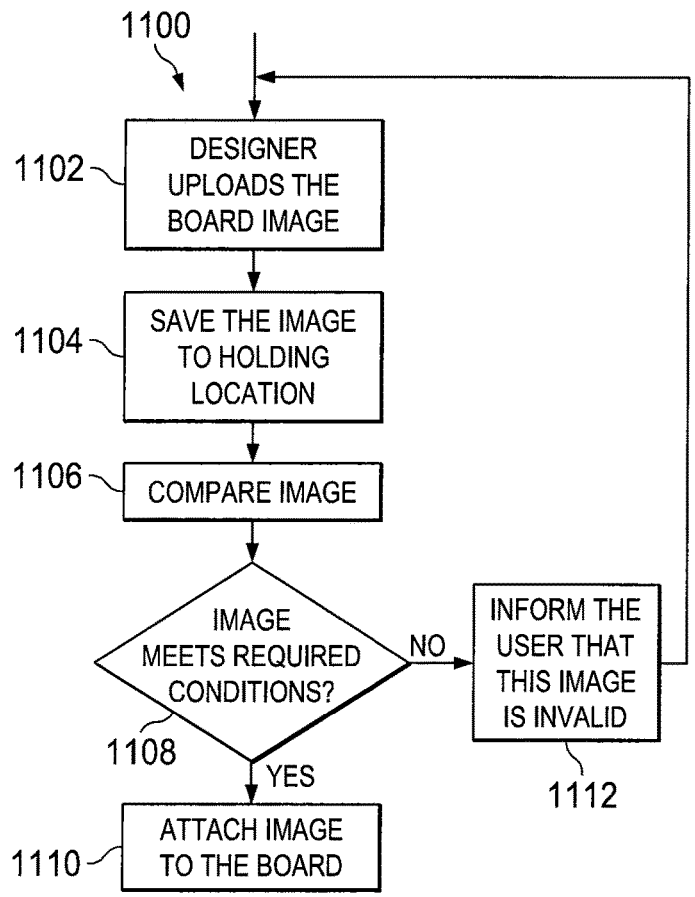
FIG. 11 is a schematic diagram of an illustrative process flow for a designer to add an image to a new or existing board.

Referring now primarily to FIG. 11, an illustrative process 1100 for a designer 108 to add an image to a new or existing board is presented. When the designer 108 uploads an image at step 1102, the image is placed in a temporary holding place at step 1104. The uploaded image may first be validated before introduced to the system 102 in a way that makes the image available to others. The validation process may, for example, involve comparing the image to characteristics of similar images stored in the data base or other methods at step 1106 to reduce the likelihood that the image representing a design is a copy or is substantially similar to another design. The comparison may be to other images in the system 102 or to internet sites or databases or another comparison resource. As suggested at interrogatory 1108, if the new image meets all the needed conditions so as to answer in the affirmative, the image will be attached to the board at step 1110, and if not, it will be rejected at step 1112. If rejected, the designer is informed of the rejection.

Figure 12:
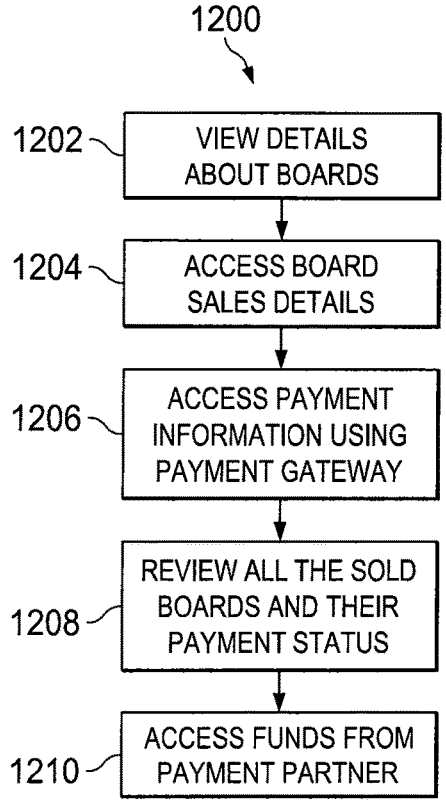
FIG. 12 is a schematic diagram of an illustrative process flow for a designer to access his or her account details and to take other actions.

Referring now primarily to FIG. 12, an illustrative process 1200 for a user 108, 115, 124 to access his or her account details or take other actions is presented. The user, e.g., designer 108, may select an option to view his or her boards and the relevant details at step 1202, or access board sales details at step 1204. The user 108, 115, 124 may access payment information at 1206, review sold boards and their payment status at step 1208; access funds from a payment partner, e.g., PAYPAL payment system, at step 1210. It should be understood that the user may navigate to any of the steps without going through each sequentially.

Referring now primarily to FIG. 13, an illustrative process 1300 for a user 108, 116, 124 to refer the system 102 to another designer or user is presented. The user 108, 116, 124 enters the contact details of the proposed user at step 1302 and the referral is sent at step 1304. The user 108, 116, 124 is able to manage the referral at step 1306; edit/update the referral at step 1308; delete a referral at step 1310; resend a referral that was sent earlier at step 1312. When a referred prospect becomes a member through the membership process, the referral status may be updated as shown at step 1314 with appropriate information. The referring user 108, 116, 124 may be given a credit or other incentive by the system 100.

Referring now primarily to FIG. 14, an illustrative process 1400 for a designer 108 accessing rating information is presented. The designer 108 navigates to and requests his or her rating score at step 1402. The designer 108 may select to view activity details for different time intervals at step 1404 or view activity details at step 1406. The designer 108 may view details of popularity scores concerning boards at step 1408.

Referring now primarily to FIG. 15, an illustrative process 1500 for how design purchasers 116, e.g., design houses, retailers, or boutiques, or textile factory/garment manufacturers 124 may search for boards and purchase the boards is presented. The user, e.g., design purchasers/design house, enters various search criteria at step 1502. The search criteria describe the user's needs or wants and then a search is performed at step 1504. Boards meeting the criteria will be displayed in the system at step 1504. The user can communicate with a designer 108 via a message system as shown at steps 1506, 1508 if desired. The designer 108 may respond as shown at step 1510. Once the user is ready to purchase the board, the user adds the design to his or her shopping cart (selection queue) at step 1512 or other purchase system. The user may be required to again or for the first time accept sales terms and conditions at step 1514 and then the user pays the board price using approved payment gateway at step 1516.

Figure 16:
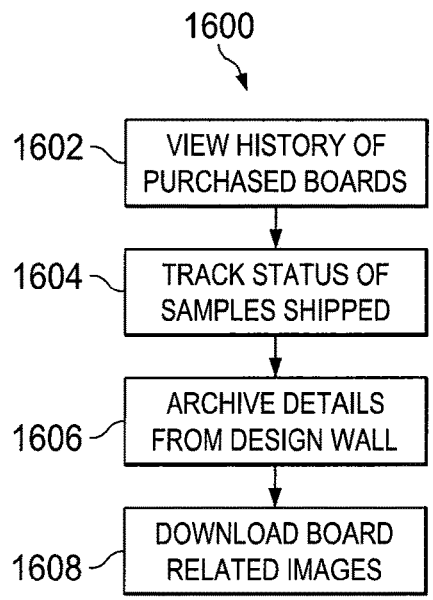
FIG. 16 is a schematic diagram of an illustrative process flow for how a design purchaser can manage their purchase history and related information.

Referring now primarily to FIG. 16, an illustrative process 1600 for how the user, e.g., design purchasers 116, can each manage their purchase history using a design wall is presented. The user may navigate to access purchase history at step 1602, track the status of any physical samples of boards that are being shipped by the designer 108 at step 1604, archive any unwanted data at step 1606, or download board details/images at step 1608.

Figure 17:
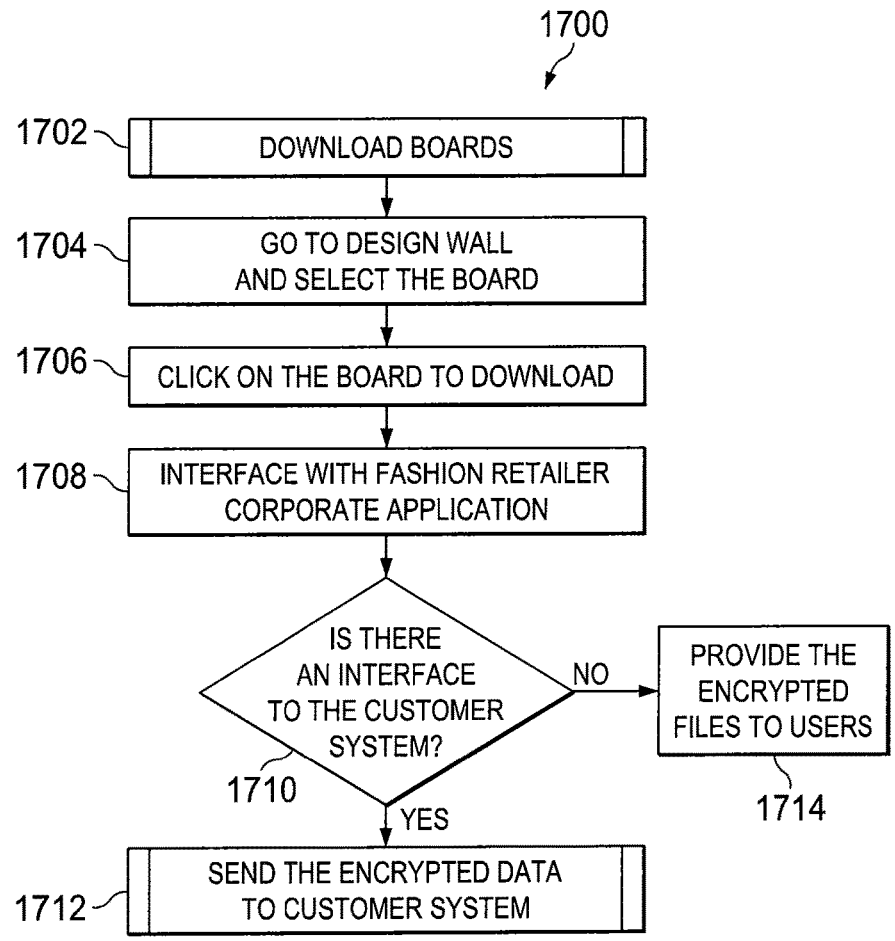
FIG. 17 is a schematic diagram of an illustrative process flow for how design purchasers or manufacturers may download design boards from the system.

Referring now primarily to FIG. 17, an illustrative process 1700 for downloading board images download process is presented. The user 116, 124 indicates a desire to download boards at step 1702 and goes to the design wall and selects a board at step 1704. The user then indicates to the system 102 a desire to download a particular board, such as by clicking on a download link at step 1706. The download process may interface with approved systems for the design purchaser's corporate systems at step 1708, e.g., Product Lifecycle Management (PLM) systems, ERP. If the user (or customer) has a customer center that interfaces with system 102, the answer to interrogatory 1710 is affirmative, and the system 102 will transmit the designs in encrypted format to the user over the user's system as shown at step 1712. The system 102 may transfer the data in encrypted format or other format at step 1712. If the answer to interrogatory 1710 is negative, i.e., if the interface does not exist, the system 102 will provide the download files in encrypted files at step 1714.

Figure 18:
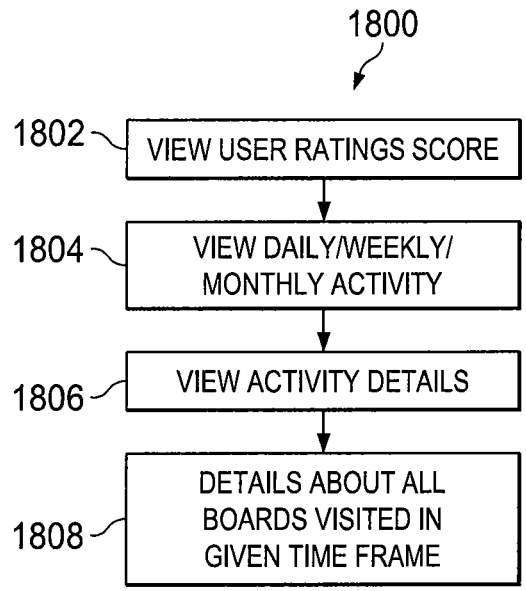
FIG. 18 is a schematic diagram of an illustrative process flow for how a design purchaser may access activity information and related information.
Figure 19:
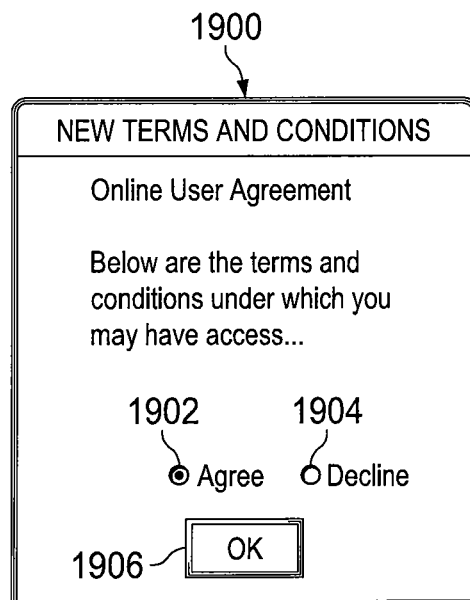
FIG. 19 is an illustrative alert notice to a user that they need to agree to new terms and conditions to continue using the system.

Referring now primarily to FIG. 18, an illustrative process 1800 for how a design purchaser 108 may access activity information is presented. The user 108 may navigate to view his or her ratings at step 1802 as rated by designers 108. The user may view the information for a selected time interval (e.g., daily, weekly, monthly, or yearly) as shown at step 1804. Once selected, the system 102 presents the details about such activity at step 1806. Details about boards viewed by the user may also be presented in other formats as indicated at step 1808.

Referring now to FIGS. 19-26, a number of illustrative, non-limiting examples of user interface screens are presented. The screens are aspects of possible communications as part of the system 100 for creating an online design marketplace. Thus, for example, during the initial log in validation, the data processing system 102 may determine that the user has not signed on to the latest terms and conditions and the user may be presented with the pop-up screen 1900 in FIG. 19. The pop-up screen will present the new terms and conditions and provides a means for the user to scroll to see all the terms. One of two radio buttons 1902 and 1904 may be selected and then the user may select the submit or okay button 1906.

Figure 20:
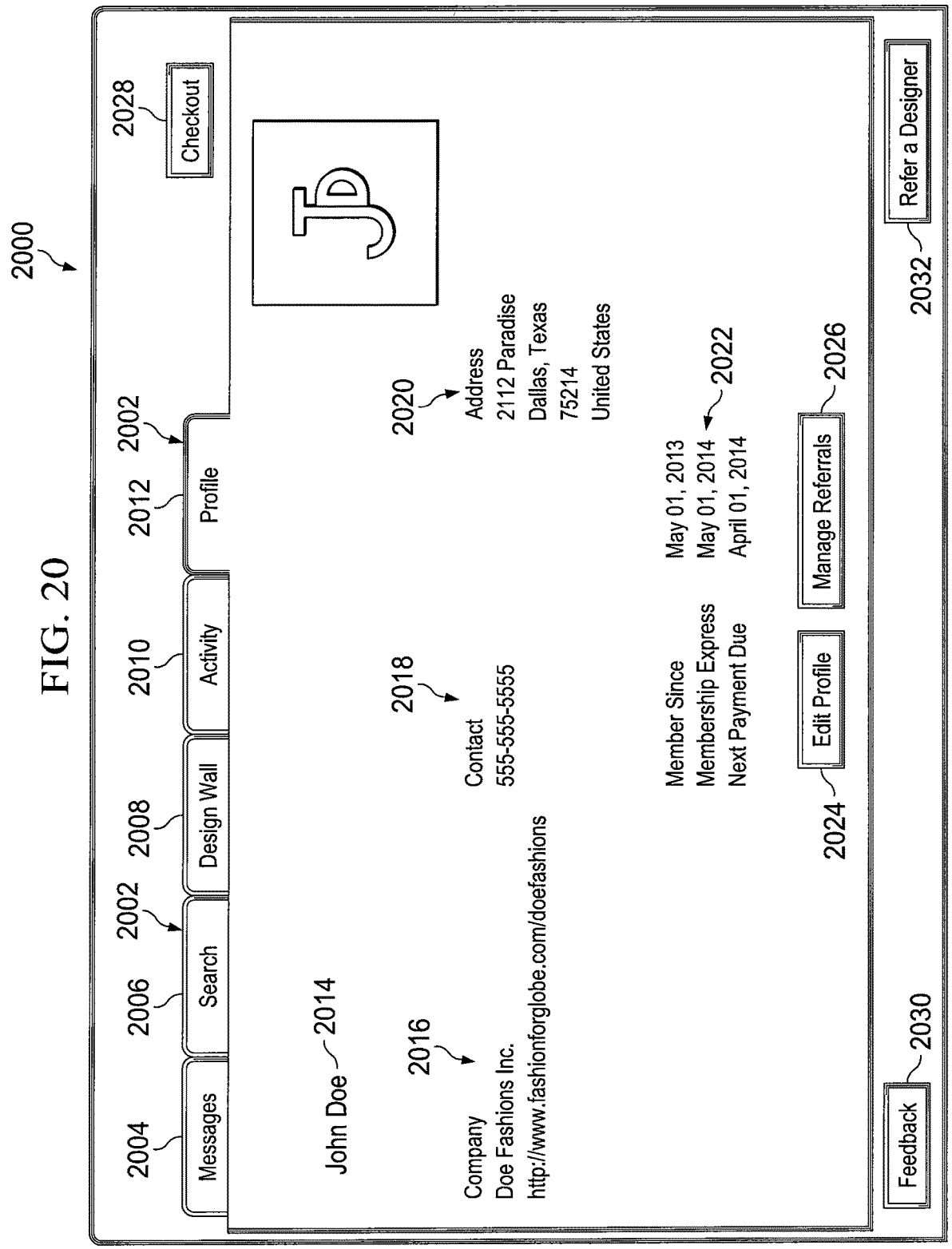
FIG. 20 is an illustrative screen presentation of a user's profile.

In another illustrative, non-limiting example of a screen that may be used to interface with a user, a profile screen 2000 is presented in FIG. 20. In this illustrative embodiment, a number of tabs 2002 are presented at the top (for orientation shown). The user 108, 116, 124 may select one of the tabs to navigate the data processing system 102. This in effect is answering various interrogatories through this action. The tabs 2002 in this illustrative example include the following: messages tab 2004, a search tab 2006, design wall tab 2008, an activity tab 2010, and a profile tab 2012.

The profile tab 2012 has been selected and the screen is presented. The profile screen 2000 can take any of numerous presentations of information. In this instance, the profile page presents the user's name at 2014, company at 2016, contact number at 2018, and address at 2020. Membership data 2022 is also presented. For example, the following information may be shown: when the member joined, when their membership expires, when the next payment is due. The user may indicate a desire to edit the profile with the election of selection of button 2024. The user may indicate a desire to manage referrals with button 2026. Each screen may include the ability to select a checkout button at 2028, feedback button at 2030 and a referral button at 2032.

Figure 21:
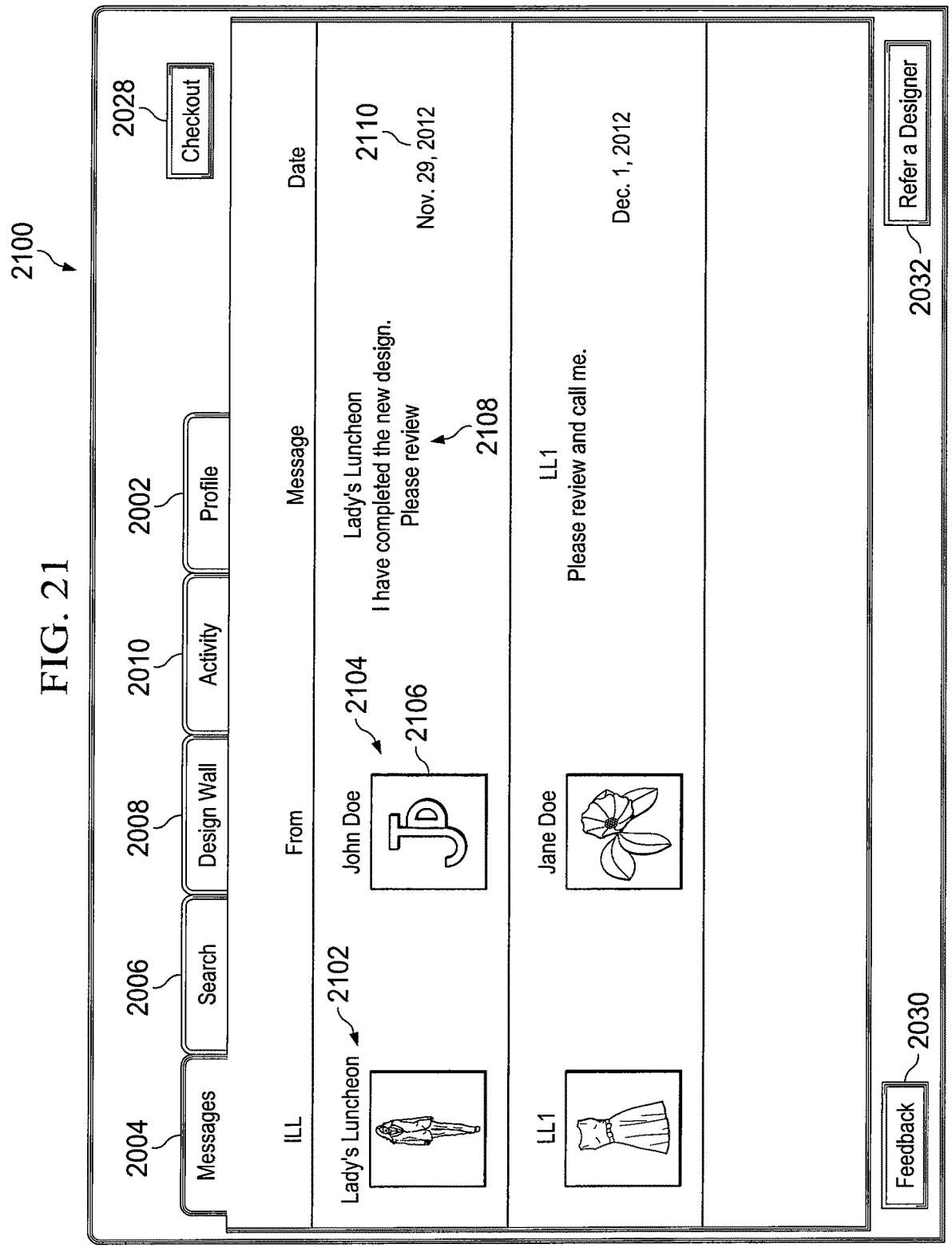
FIG. 21 is an illustrative screen of messages in a mailbox sent through a system for creating an online design marketplace.

As another illustrative, non-limiting example, a message screen 2100 is presented in FIG. 21. This screen 2100 may include various messages that have been sent to the user. Each may include an illustration or thumbnail of an attachment as shown at 2102, the name of the sender at 2104 and optionally the sender's icon at 2106. The display may include all or a portion of the message at 2108. Further, the date when the message was sent may be shown at 2110. Other features may be similar or the same as presented in FIG. 20.

Figure 22:
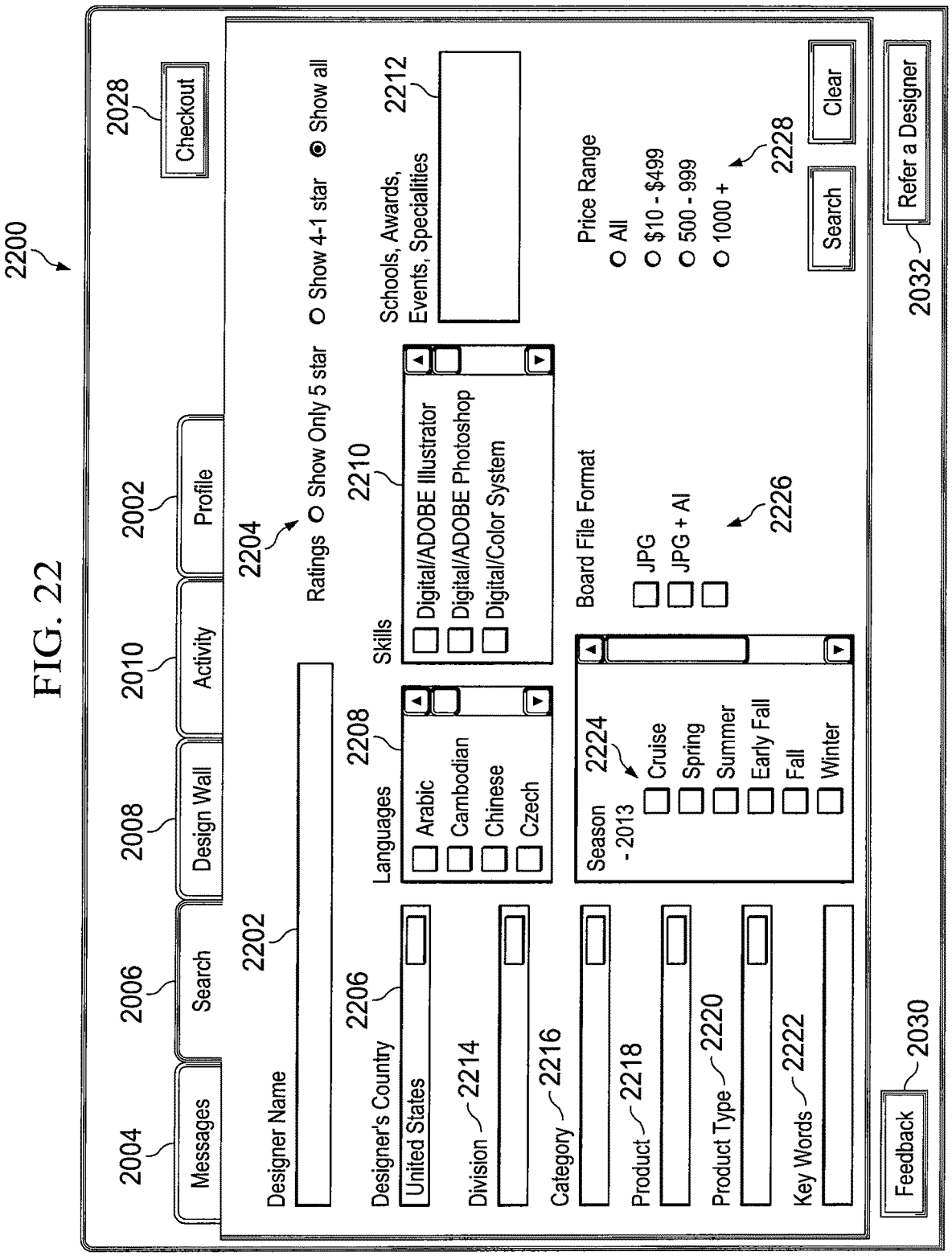
FIG. 22 is an illustrative screen showing search criteria as an aspect of a system for creating an online design marketplace.

Referring now to FIG. 22, an illustrative non-limiting example of a search criteria screen 2200 is presented. The search criteria page 2200 may include any number of desired fields that may be used to search available designs to limit the number for viewing by the design purchaser. In this example, the possible fields include a particular designer's name at 2202, level of ratings as shown at 2204, the designer's country as shown at 2206, the languages used by the designer at 2208, certain skill sets of the designer as shown at 2210, schools and awards or other information as shown at 2212. Other categories may be used such as division 2214, category 2216, product 2218, product type 2220, and finally a key word field 2222. Still other criteria may include the season at 2224, the file format available at 2226, or the price range shown at 2228. In one embodiment, the categories (e.g., 2214, 2216, 2218, 2220) are part of the hierarchy or classification of the boards into easily searchable ways, so the boards can be searched by design purchasers to help them to narrow the search results. There can be more levels of hierarchy as desired to help with searching. More file formats may be added to search criteria in 2226 as needed by the system to accommodate designer board files.

Figure 23:
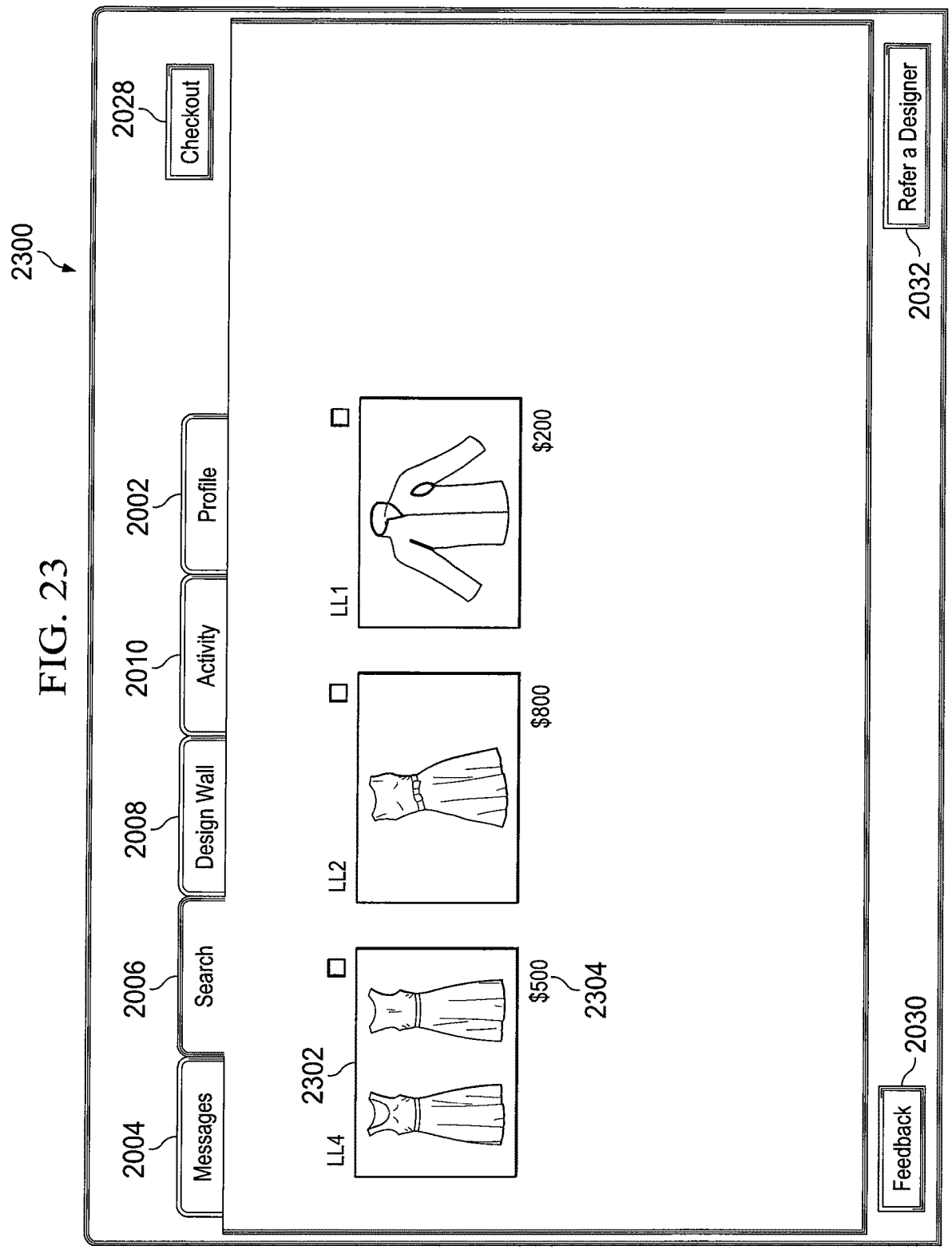
FIG. 23 is an illustrative screen presenting search results as an aspect of an online design marketplace.

Referring now to FIG. 23, an illustrative screen shot 2300 presenting search results is shown. The search results may include thumbnail sketches 2302 of available designs that match the criteria. Other information such as the price 2304 may be shown. The user may double click or otherwise select each item for a larger view, such as that shown in FIG. 24.

Figure 24:
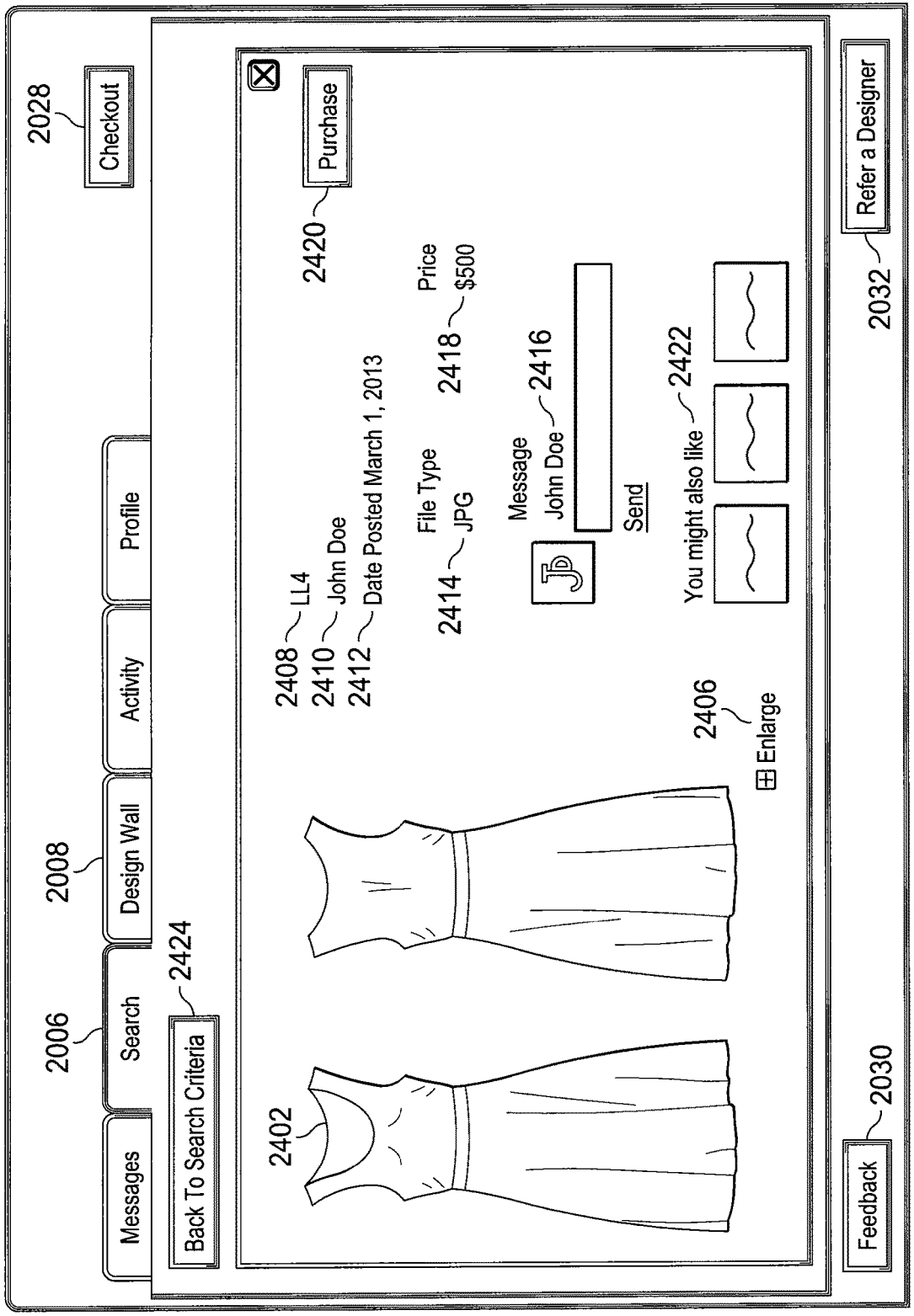
FIG. 24 is an illustrative screen presenting an illustrative design board as part of an online design marketplace system.

FIG. 24 shows an enlarged view of the designed fashion garment and in this instance design 2402 on a front side and a back side. The user may further enlarge the views using the enlargement button 2406 or by scrolling over the design in some embodiments. Additional information may be presented such as the numerical identifier 2408, designer's name 2410, the date posted 2412, the file type involved 2414, an instant messaging field 2416, and the price 2418. A button 2420 may be used to select the design for purchase. In addition, based on this selection, additional designs may be suggested to the user as shown at 2422. The user may click button 2424 to return to the search criteria page.

Figure 25:
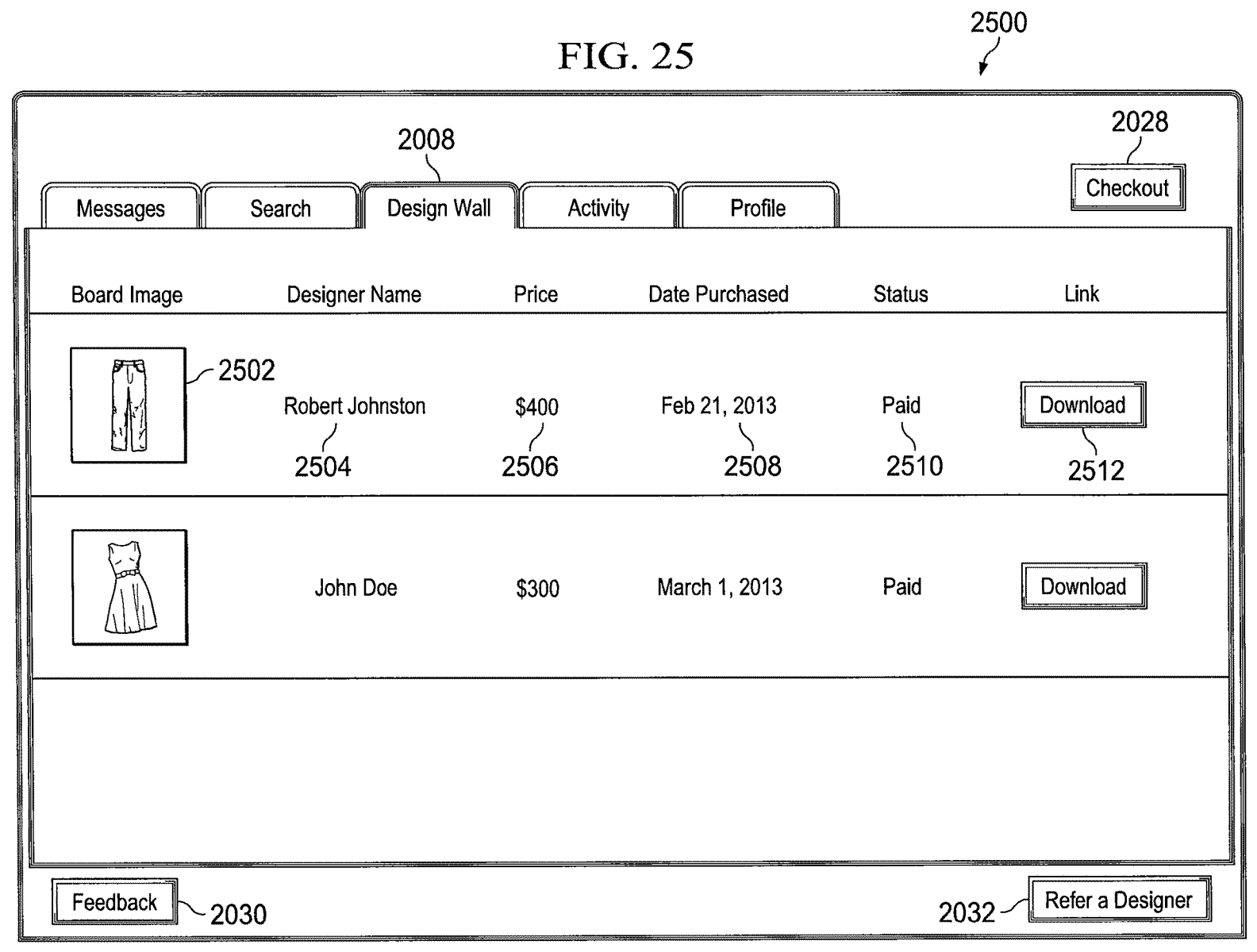

Refer now to FIG. 25, another illustrative, non-limiting example of a screen for use by user 116 is presented. This screen 2500 presents a design wall example. The design wall may include a board image 2502, the designer's name 2504, the price 2506, the date purchased 2508, the status of payment 2510, and a download link at 2512. Other data or information may be presented and, again, it should be understood that this is only one illustrative example.

Figure 26:
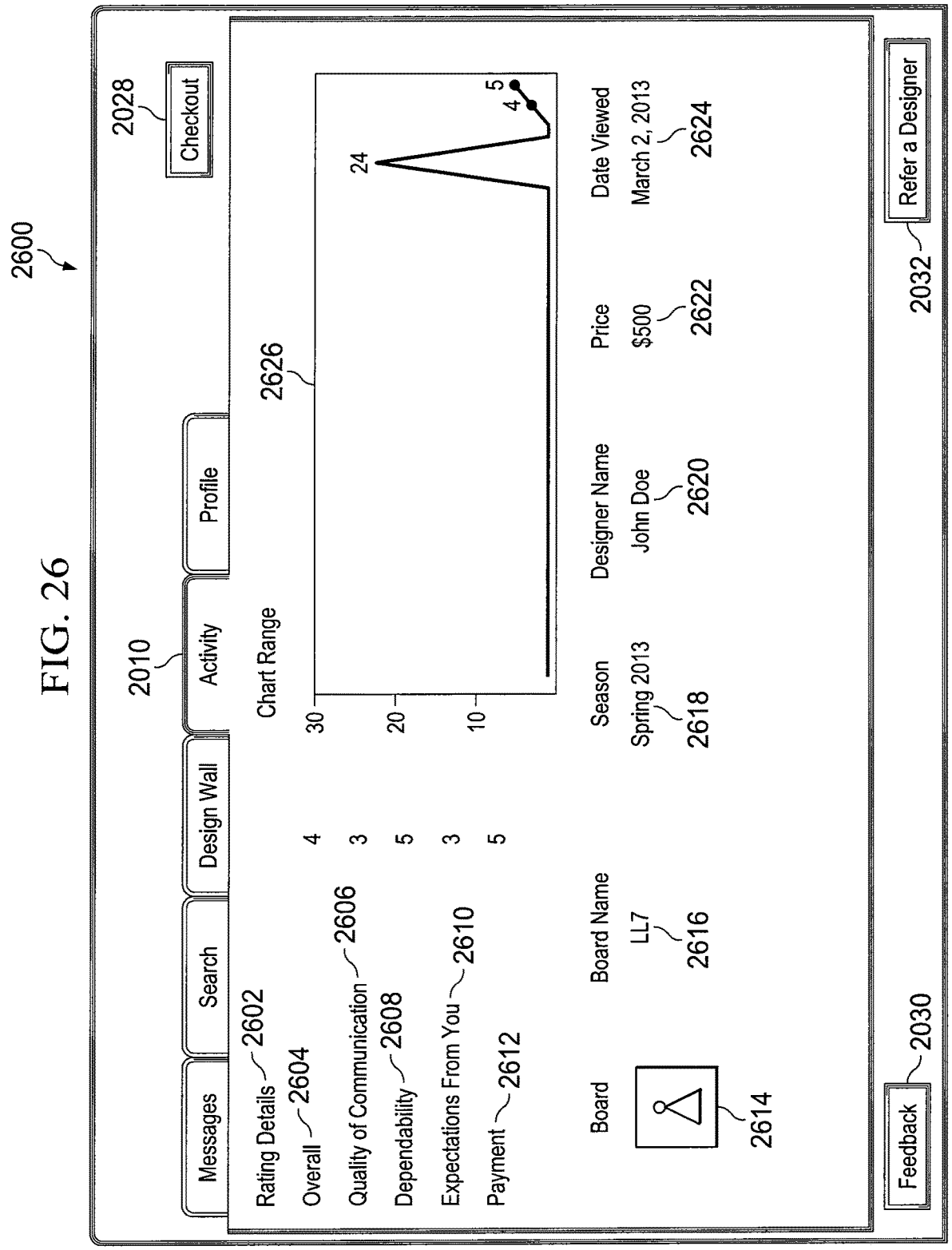
FIG. 26 is an illustrative screen presenting a user with a summary of activity as part of an online design marketplace.

Referring now to FIG. 26, an illustrative non-limiting example of a screen 2600 for showing a user's activity is presented. The screen 2600 may include a number of rating details 2602, such as an overall rating 2604, a quality of communication rating 2606, dependability rating 2608, expectations from the user 2610, and payment rating 2612. Designs viewed may be shown with summarizing data such as a small view of the image at 2614, the board name or number 2616, the season 2618, the designer 2620, the price 2622, and the date viewed at 2624. Of course, other information could be included. A chart 2626 may be included that shows the activity by date. For example, on this chart, a graph is made with the number of designs viewed on the ordinate axis and time shown on the abscissa axis.

All the example screens are shown in English, but it should be understood that in other embodiments, the terms could be translated.

A person of skill in the art will appreciate that the process flows presented earlier can be presented in numerous ways to the users. Some illustrative screens have been presented while other screens are described or may be readily based on the presentation herein. For example, the designer may have a portfolio page that presents the various boards that they have uploaded. The screen may have a drop-down menu for different named portfolios and may have a button to allow all the portfolios to be viewed at once. The same screen may have the button to select to add a new board. Status information can be included on each board such as the price or the number of views. There may also be a tab for entering and forming a new portfolio. In such case, the screen may ask for a portfolio name, a description of the portfolio, the division (e.g., accessories, shoes), season, category, etc. On the portfolio tab, the designer may select one of the boards and see board details for one of his or her uploaded designs. For example, it may show the large views of the design, the file type information, the price, the board name, the date that it was posted or uploaded.

The portfolio tab may also include an upload button. When the upload button is selected, the designer may have entry blanks that include the board name, description, product, product type/style, key words associated with the design, the file type, the price, etc. Another set of buttons may list how long the design may be allowed to be posted on the system. Buttons may further include save, save and publish, clear all, cancel.

As another illustrative example, a screen could present account information for the designer. This screen may include each board that has been sold or is being processed. For example, each board may include an image, a portfolio name, the board name, the purchaser, the price, the date sold, and the status. Other information might be included.

As still additional examples, for each user, the user may have a tab that presents his or her profile. A profile may include information and descriptions. For example, in one embodiment, the profile shows the user's icon, has a summary statement about the person, address, telephone numbers, primary language, skills (e.g., technical/designer, digital/ADOBE illustrator, technical/computer pattern systems, etc.), brand names, schools, awards, events, specialties, membership information, etc. The screen may also include buttons that allow one to edit the profile or manage referrals.

In another illustrative embodiment, a dashboard screen may be included. For example, the screen may be accessible on the side of every screen and when the cursor is placed on it, it pulls out the dashboard screen into view. The dashboard screen includes quick summary information for the user, such as designs viewed or purchased over different time periods and may show suggested designs. The dashboard can give short and easy access to useful information without having to traverse to that screen. It may include things like payment details, message, alerts etc.

In another illustrative screen, a payment processing interface may be presented. The payment screen may present the users with options to make payments for boards to purchase or for pay for membership fees. In another illustrative screen, cart items may be presented, so design purchasers 116, 124 may view the boards they have in their cart before proceeding to check out or payment processing. Users can remove any board they do not want to purchase from their cart and then go to payment screen.

In another illustrative screen, check out and payment options may be presented. A user may select the payment method. Approved payment gateways or options may include PAYPAL, SQUARE and any other payment gateways. Users can pay all with any credit or debit card and payment systems as supported by system.

In still another illustrative screen, managing referral information may be presented. Users can review the status of their referrals and may update the referring user details, resend the invitation, delete referrals and see the status of referrals.

In another illustrative embodiment, the system 100 may be configured to accommodate a design competition. In this embodiment, access for submitting designs may be granted to a plurality of contestants. The designs may be viewed and one or more selected by a sponsoring design purchaser. In another embodiment, access to the designs may be granted to the public for voting. In this instance, the public viewer selects the design and rates it.

In one illustrative embodiment, a machine readable medium embodying instructions, the instructions causing a data processing system to perform a method, the method comprising the steps of: validating a plurality of designers as approved designers; receiving a plurality of available designs from the plurality of designers; validating a plurality of design purchasers as approved design purchasers; presenting at least one design of the plurality of designs to a design purchaser of the plurality of design purchasers in response to a request from the design purchaser; receiving a selection from the design purchaser of a desired design from the at least one design of the plurality of designs of the previous step; and providing the selected design to the design purchaser in exchange for purchase compensation. The method may further include the step of delivering at least a portion of the purchase compensation to the designer of the selected design. The method may further includes the step of comparing the plurality of available designs against a comparison resource to identity any designs that are substantially similar to another design in the comparison resource.

In another illustrative embodiment, a system for connecting fashion designers and design purchasers to facilitate the selection and sell of fashion designs includes a processor; one or more input devices associated with the processor for introducing data to the processor; one or more output devices associated with the processor for presenting information from the processor; and a storage medium for storing thereon program logic for execution by the processor. The program logic on the processor performs the following steps: validating a plurality of fashion designers, each seeking to upload fashion designs for sale; validating a plurality of design purchasers, each seeking to obtain fashion designs to have manufactured and sold; receiving a plurality of fashion designs from one or more of the plurality of fashion designers; providing access to the plurality of fashion designs to one or more design purchasers; receiving a request for a particular fashion design from one of the plurality of design purchasers; obtaining payment from the design purchaser; delivering the fashion design to the design purchaser; and delivering at least a portion of the payment to the fashion designer.

In another illustrative embodiment, a computer-implemented method for delivering fashion designs into the retail market includes validating a fashion designers seeking to submit designs for sale; uploading fashion designs from the validated designer; validating a design purchaser; providing access to the validated design purchaser of the uploaded fashion designs; receiving a selection request from the validated design purchaser; receiving payment from the validated design purchaser; and providing the fashion designs to the validated design purchaser.

In some embodiments a technical challenge has arisen in that data in the field is desired or needed for items made using the systems herein. One additional aspect of the disclosure that addresses this involves assigning a unique identifying code, e.g., QR (quick response) code to each product or item. The codes may be on labels applied or sewn into or otherwise attached to the design item. In some embodiments, the code is assigned in the software system when the product or item is in non-physical form. The code can be printed directly on the item in some embodiments or applied with a sticker. Other codes like a bar code, number, alpha-numeric code, RFID tag, etc. can also be used in place of QR Code. Along with the code, meta data for product or item is collected and accessible by a networked system. The meta data may include one or more of the following: design of the product, design files in different computer software formats (e.g., JPG, JPEG, BMP, Adobe Illustrator, CorelDraw, other different vector file formats, other raster file formats, any other image file formats), product name, product description, product seasonality, product category, designer who created the design, 3D designer who worked on the product, 3D sample details (e.g., 3D file, 3D rendering of the product, 3D illustration, photoshop the 3D images on real/live fashion model and/or on digital models, or mannequin), raw material information, including but not limited to raw material supplier details, prices of raw material, product development team details, manufacturer details, manufacturing price of the product, photos and details of different samples created during the product development (e.g., proto sample), sales samples, start and end date of manufacturing process, photos of the manufacturing process, photos and details of different samples created during the production stage (e.g., PP (Pre production) sample, TOP (Top of Production) sample, Size run samples), details of the worker working on the product (e.g., their name, photo of the person, location of the person, manufacturing facility details, person skill details, other personal/professional details), photos of the workers and other team members working on the product at different stages of the production process (e.g., raw material preparation, raw material processing, cutting the raw material, prepping the raw material, stitching/making the product, all insights into the manufacturing processes as applicable based on product being made), photos of the finished product at the factory, photos of the product journey from factory to warehouse/distributor, complete details about the logistics company, details of the journey of the product, photos of the journey from warehouse/distributor to consumer, details of the consumer using the product, and details about the product being sold and brought in resell market. Other data may be collected.

Then, when a consumer or other user scans the identifying code, e.g., QR code (or other identifying code), using their smart device enabled with camera or sensor (phone, camera, smartphone, scanner, and any other devices capable of reading the code or other codes as applicable), the consumer receives data. This may be done by the identifying code pulling a mobile app that accesses the meta data or by the code taking the device to a website that presents the meta data.

Based on QR code (or identifying code) or additional details provided on the app/website, the user is presented with at least some of the meta data collected during the process as referenced above. The brand/client can be given control over what type of meta data is provided to the user. In some embodiments, a consumer may add data; when a consumer provides any data to the meta data, the consumer may be given control over what type of data will be shared with brand/client and/or general public.

In one embodiment, the systems presented above further have an executable program to store meta data concerning the desired design, generate a third graphical user interface that is accessed in response to an identifying code read by a smart device, and provide at least some of the stored meta data to the smart device in response to reading the identifying code.

In one illustrative embodiment, after a design item has been searched and acquired through the systems and methods discussed above, the user (consumer, vendor, or other) may desire additional information about the design. The user utilizes a smart device with a camera or sensor to read an identifying code (QR Code, bar code, RFID tag) on the product. That prepares a third user interface that is interacts with a server or other memory to present data (at least some of the meta data mentioned above) to the user. In some embodiments, the owner of the data (e.g., brand, vendor, manufacturing, consumer, system owner) controls what data is available.

In some embodiments, the user can use the identifying code to do many other actions. For example, the user may connect with the product creator using the application or website and learn more about the product; provide feedback/review about the product; connect with the brand and interact with people involved in the product and share their experience; donate money or share other non-monetary items with product creators; support any charity working with the product creators; provide improvement ideas; connect with the brand owner for future products; share specific details about the current design with the brand owners that can be passed to other users; connect with other users; submit ideas for future design items; etc.

Although the present invention and its advantages have been disclosed in the context of certain illustrative, non-limiting embodiments, it should be understood that various changes, substitutions, permutations, and alterations can be made without departing from the scope of the invention as defined by the appended claims. It will be appreciated that any feature that is described in connection to any one embodiment may also be applicable to any other embodiment.

It will be understood that the benefits and advantages described above may relate to one embodiment or may relate to several embodiments. It will further be understood that reference to "an" item refers to one or more of those items.

The steps of the methods described herein may be carried out in any suitable order, or simultaneously where appropriate.

Where appropriate, aspects of any of the examples described above may be combined with aspects of any of the other examples described to form further examples having comparable or different properties and addressing the same or different problems.

It will be understood that the above description of preferred embodiments is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the scope of the claims.

What is claimed:

1. A design matching system comprising:
    a server in communication with a computing device and comprising at least one processor; and
    an application executable by the at least one processor to:
        generate a first graphical user interface (GUI) for receiving designer information associated with a designer,
        generate a second graphical user interface for receiving design purchaser information associated with a design purchaser,
        validate the designer by checking designer credentials against a designer database or sign the designer up to have valid credentials in the designer database,
        receive from the designer one or more clothing designs in a digital format available for matching and purchase,
        perform a fraud check of any design received from the designer by comparing attributes of the design with a known design database, wherein comparing the attributes of the design includes more attributes than could be compared by a human in a commercially reasonable time,
        validate the design purchaser by checking a design purchaser credentials against a design purchaser database or signing up the design purchaser to have valid credentials in the design purchaser database,
        receive design search criteria from the design purchaser using the second graphical user interface,
        in response to the design search criteria, match the design search criteria with attributes of designs entered by the designer to develop a match set of designs,
        present the match set of designs to the design purchaser through the second graphical user interface including a set purchase price associated with each of the designs,
        receive a design selection of a desired design entered by the design purchaser through the second graphical user interface,
        receive payment from the design purchaser and deliver the desired design to the design purchaser,
    deliver at least a partial payment to the designer for the desired design,
        generate a third graphical user interface for receiving clothing manufacturer information associated with a clothing manufacturer,
        receive a bid request from the design purchaser to receive a manufacturing bid for the desired design,
        deliver the bid request to the clothing manufacturer,
        store meta data concerning the desired design,
        generate a fourth graphical user interface that is accessed in response to an identifying code read by a smart device, and
        provide at least some of the stored meta data to the smart device in response to reading the identifying code.

2. The system of claim 1, wherein the identifying code comprises a QR code.

3. The system of claim 1, wherein the identifying code comprises a bar code.

4. The system of claim 1, wherein the identifying code comprises a RFID tag.

5. The system of claim 1, wherein the identifying code comprises an alphanumeric code.

6. The system of claim 1, wherein the stored meta data comprises design data.

* * * * *